United States Patent
Vaddadi et al.

(10) Patent No.: US 8,582,889 B2
(45) Date of Patent: Nov. 12, 2013

(54) SCALE SPACE NORMALIZATION TECHNIQUE FOR IMPROVED FEATURE DETECTION IN UNIFORM AND NON-UNIFORM ILLUMINATION CHANGES

(75) Inventors: Sundeep Vaddadi, San Diego, CA (US); John H. Hong, San Diego, CA (US); Onur C. Hamsici, La Jolla, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 12/986,607

(22) Filed: Jan. 7, 2011

(65) Prior Publication Data

US 2011/0170780 A1 Jul. 14, 2011

Related U.S. Application Data

(60) Provisional application No. 61/293,437, filed on Jan. 8, 2010.

(51) Int. Cl.
*G06K 9/00* (2006.01)

(52) U.S. Cl.
USPC .......................................... 382/195; 382/168

(58) Field of Classification Search
USPC .......................................... 382/159, 195, 201
See application file for complete search history.

(56) References Cited

U.S. PATENT DOCUMENTS

| 8,004,576 B2 * | 8/2011 | Sharma ....................... 348/222.1 |
| 2005/0047647 A1 * | 3/2005 | Rutishauser et al. ......... 382/159 |
| 2006/0233423 A1 | 10/2006 | Najafi et al. |
| 2007/0065015 A1 | 3/2007 | Nishiyama et al. |
| 2007/0183680 A1 | 8/2007 | Aguilar |
| 2009/0324087 A1 * | 12/2009 | Kletter ........................... 382/195 |
| 2010/0080469 A1 * | 4/2010 | Liu et al. ........................ 382/201 |
| 2010/0303354 A1 * | 12/2010 | Reznik ........................... 382/168 |

FOREIGN PATENT DOCUMENTS

JP    2007072814 A    3/2007

OTHER PUBLICATIONS

Ghosh et al., "Low-level brightness-contrast illusions and Non-classical receptive field of mammalian retina", Proceedings of the 2005 International Conference on Intelligent Sensing and Information Processing, Jan. 2005, pp. 529-534.
Swaminathan et al., "Multiple appearance models for face tracking in surveillance videos", IEEE Conference on Advanced Video and Signal Based Surveillance, Sep. 2007, pp. 383-387.

(Continued)

*Primary Examiner* — Hadi Akhavannik
(74) *Attorney, Agent, or Firm* — James R. Gambale, Jr.

(57) ABSTRACT

A normalization process is implemented at a difference of scale space to completely or substantially reduce the effect that illumination changes has on feature/keypoint detection in an image. An image may be processed by progressively blurring the image using a smoothening function to generate a smoothened scale space for the image. A difference of scale space may be generated by taking the difference between two different smoothened versions of the image. A normalized difference of scale space image may be generated by dividing the difference of scale space image by a third smoothened version of the image, where the third smoothened version of the image that is as smooth or smoother than the smoothest of the two different smoothened versions of the image. The normalized difference of scale space image may then be used to detect one or more features/keypoints for the image.

33 Claims, 17 Drawing Sheets

(56) References Cited

OTHER PUBLICATIONS

Lowe, "Distinctive Image Features from Scale-Invariant Keypoints", Computer Science Department, University of British Columbia, Vancouver, B.C., Canada. Jan. 2004.

Lowe, "Towards a Computational Model for Object Recognition in IT Cortex", Computer Science Department, University of British Columbia, Vancouver, B.C., Canada. May 2000.

D G Lowe, "Distinctive image features from scale-invariant key points," International Journal of computer vision, vol. 60, pp. 91-110, 2004.

International Search Report and Written Opinion—PCT/US2011/020613, ISA/EPO—May 17, 2011.

Fujiyoshi H., "Gradient-Based Feature Extraction: SIFT and HOG." The Technical Report of Information Processing Society of Japan., Sep. 3, 2007, vol. 2007, No. 87. 211-224.

* cited by examiner

*Exemplary Object Recognition Stages*

FIG. 2 — *Exemplary Image Processing Stage – Gaussian Scale Space Generation*

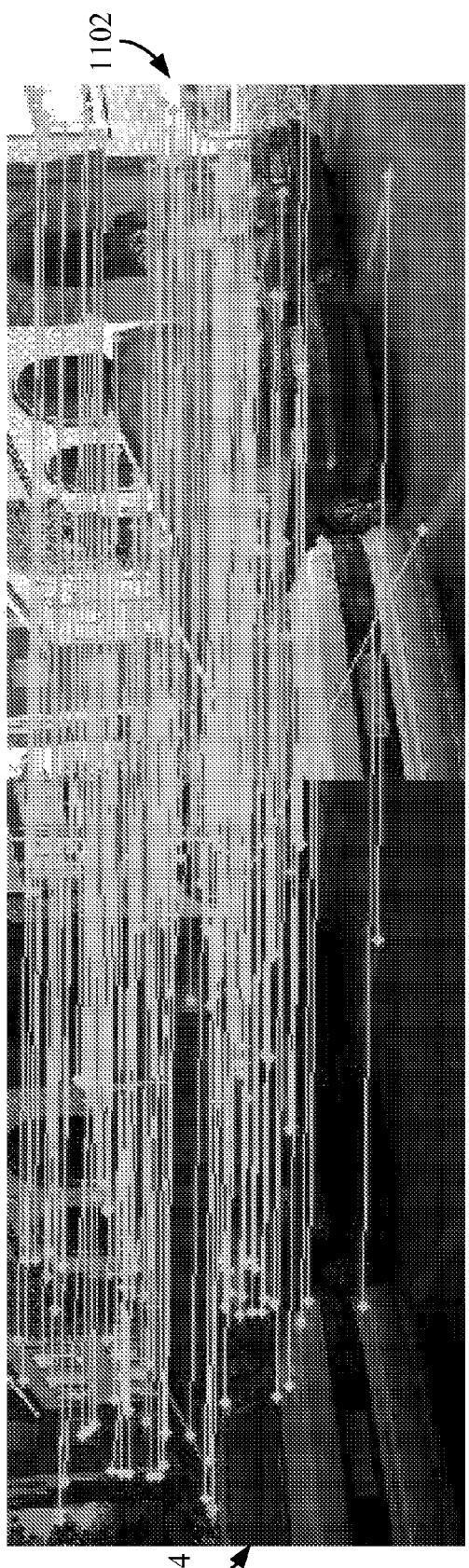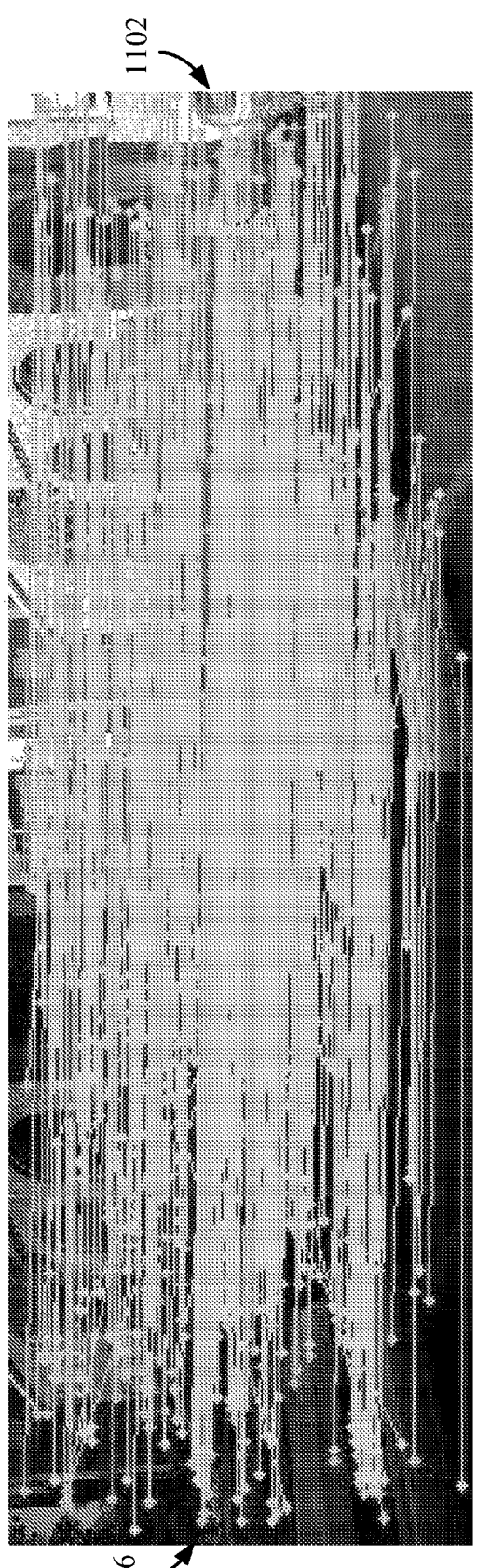
FIG. 11A
FIG. 11B

SCALE SPACE NORMALIZATION TECHNIQUE FOR IMPROVED FEATURE DETECTION IN UNIFORM AND NON-UNIFORM ILLUMINATION CHANGES

CLAIM OF PRIORITY UNDER 35 U.S.C. §119

The present Application for patent claims priority to U.S. Provisional Application No. 61/293,437 entitled "Keypoint Stabilization Technique", filed Jan. 8, 2010, assigned to the assignee hereof and hereby expressly incorporated by reference herein.

BACKGROUND

1. Field

One feature relates to computer vision, and more particularly, to methods and techniques for improving performance and/or efficiency of image recognition systems.

2. Background

Various applications may benefit from having a machine or processor that is capable of identifying objects in a visual representation (e.g., an image or picture). The field of computer vision attempts to provide techniques and/or algorithms that permit identifying objects or features in an image, where an object or feature may be characterized by descriptors identifying one or more keypoints. These techniques and/or algorithms, such as SIFT (Scale Invariant Feature Transform), are often also applied to image recognition, object detection, image matching, 3-dimensional structure construction, stereo correspondence, and/or motion tracking, face recognition, among other applications.

Generally, object or feature recognition may involve identifying points of interest (also called keypoints) in an image and/or localized features around those keypoints for the purpose of feature identification, image retrieval, and/or object recognition. Having high stability and repeatability of features is of great importance in these recognition algorithms. Thus, the keypoints may be selected and/or processed such that they are invariant to image scale changes and/or rotation and provide robust matching across a substantial range of distortions, changes in point of view, and/or noise and change in illumination. Further, in order to be well suited for tasks such as image retrieval and object recognition, the feature descriptors may preferably be distinctive in the sense that a single feature can be correctly matched with high probability against a large database of features from a plurality of target images.

After the keypoints in an image are detected and located, they may be identified or described by using various descriptors. For example, descriptors may represent the visual features of the content in images, such as shape, color, texture, rotation, and/or motion, among other image characteristics. The individual features corresponding to the keypoints and represented by the descriptors are then matched to a database of features from known objects.

As part of identifying and selecting keypoints for an image, some points that have been selected may need to be discarded due to lack of precision or confidence. For instance, some initially detected keypoints may be rejected on the grounds of poor contrast and/or poor localization along edges. Such rejections are important in increasing keypoint stability with respect to illumination, noise and orientation variations. It is also important to minimize false keypoint rejections which would decrease repeatability of feature matching. However, having spatially varying illumination changes poses a significant problem for feature detection since effects such as shadowing can effectively cause interesting features to be ignored entirely, decreasing repeatability in object recognition.

Therefore, a method or approach is needed to define thresholds that are adaptive to local and global illumination changes for feature selection within object recognition algorithms.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A method operational in an image feature detection device is provided for reducing the effects of illumination changes on the keypoint/feature detection in an image. An image may be convolved with a plurality of smoothening kernels of different scaling widths to obtain a plurality of smoothened versions of the image, the plurality of smoothened versions defining a scale space pyramid. A difference of scale space image may be generated by taking the difference between two different smoothened versions of the image. The two different smoothened versions of the image may be at adjacent levels in the smoothened scale space pyramid. For instance, the third smoothened version of the image may have an equal or wider scale (e.g., smoothening kernel) than the greater of the scales (e.g., smoothing kernels) for the two different smoothened versions of the image. This process may be repeated to generate a difference of scale space by taking the difference between pairs of different smoothened versions of the image, the difference of scale space image forming part of the difference of scale space.

A normalized difference of scale space image may be generated by dividing the difference of scale space image by a third smoothened version of the image, where the third smoothened version of the image that is as smooth or smoother than the smoothest of the two different smoothened versions of the image. Detection of one or more features for the image may be performed by using the normalized difference of scale space image. One or more features for the image may be identified using the normalized difference of scale space by detecting local extrema within the normalized difference of scale space image. Each feature may include a keypoint and information about its surrounding points. Descriptors for the image may then be generated based on the identified one or more features.

Similarly, an image feature detection device may be provided for reducing the effects of illumination changes on the keypoint/feature detection in an image. The feature detection device may include: a scale space generator, a difference of scale space generator, a difference of scale space generator normalizer, a feature detector, and/or a feature descriptor generator. The scale space generator may be adapted to convolve an image with a plurality of smoothening kernels of different scaling widths to obtain a plurality of smoothened versions of the image, the plurality of smoothened versions defining a scale space pyramid. The difference of scale space generator may be adapted to generate a difference of scale space image by taking the difference between two different smoothened versions of the image. The two different smoothened versions of the image may be adjacent levels in the smoothened scale space pyramid. The difference of scale space generator may be further adapted to generate a difference of scale space by taking the difference between pairs of different smoothened versions of the image, the difference of scale space image forming part of the difference of scale space.

The difference of scale space generator normalizer may be adapted to generate a normalized difference of scale space image by dividing the difference of scale space image by a third smoothened version of the image, where the third smoothened version of the image is as smooth or smoother than the smoothest of the two different smoothened versions of the image. The third smoothened version of the image may have an equal or wider scale (e.g., smoothening kernel) than the greater of the scales (e.g., smoothening kernel) for the two different smoothened versions of the image.

The feature detector may be adapted to use the normalized difference of scale space image to detect one or more features for the image. The feature detector may be adapted to identify features for the image using the normalized difference of scale space by detecting local extrema within the normalized difference of scale space image. The feature descriptor generator may be adapted to generate descriptors for the image based on the identified one or more features.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 11 (comprising FIGS. 11A and 11B) illustrates the impact that difference of scale space normalization has on keypoint matching verification.

DETAILED DESCRIPTION

Figure 1:
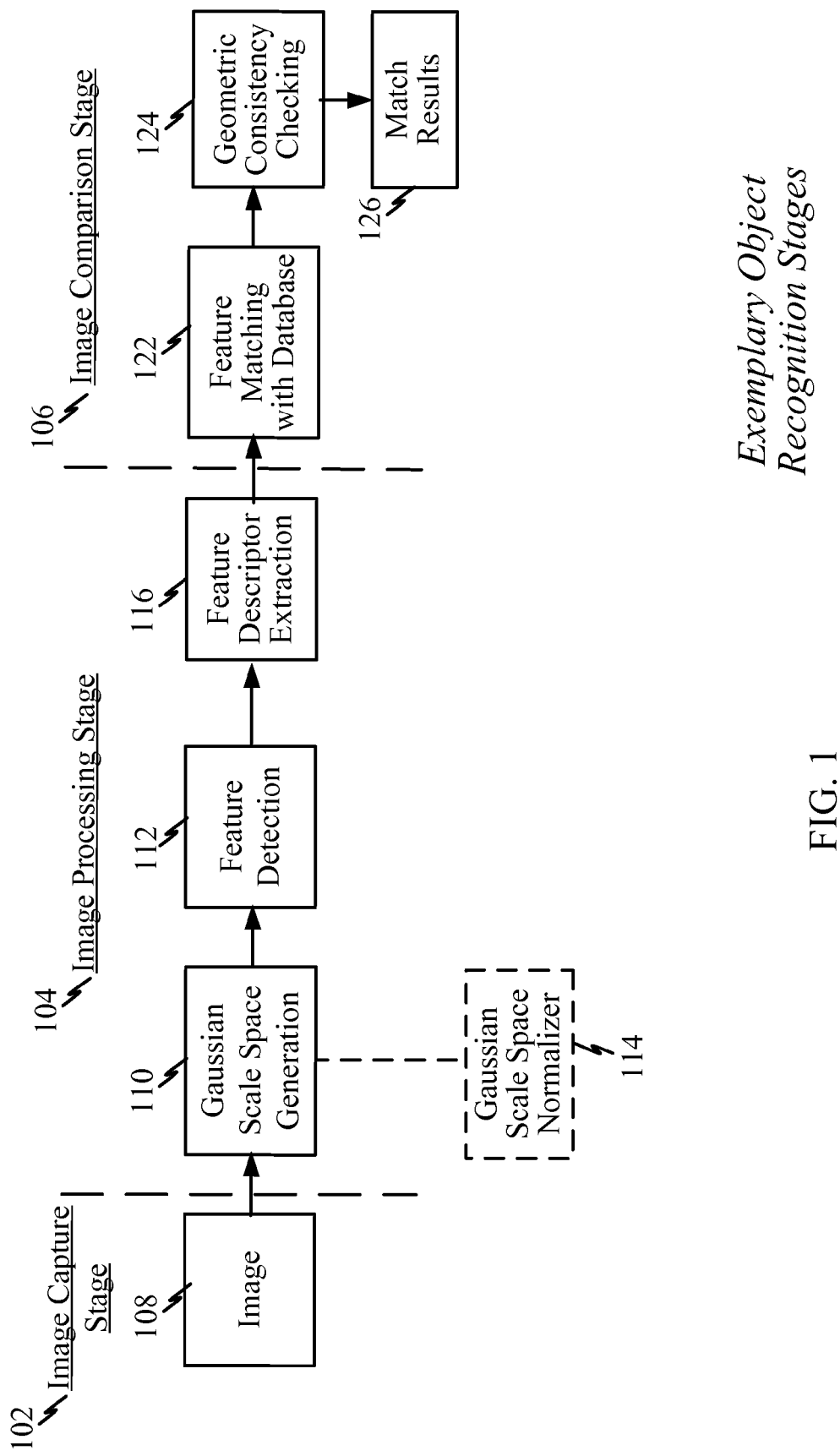
FIG. 1 is a block diagram illustrating the functional stages for performing object recognition on a queried image.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

Various features described herein relate to improving the speed and/or efficiency of image recognition. According to a first aspect, the effects of illumination (either uniform or non-uniform) across an image is eliminated or reduced by normalizing a difference of scale space prior to feature/keypoint detection. Feature/keypoint detection is then performed on the normalized difference of scale space.

Generally, it is recognized that illumination in an image can be represented by a spatially varying function. Therefore, the effect of illumination (e.g., shading, light image, dark image, etc.) can be neutralized for purposes of feature/keypoint detection by a normalization process that factors out the illumination function. For example, an image may be processed by progressively blurring the image using a function G (i.e., kernel or filter) with a range of smoothening factors to generate a smoothened scale space L of the image. A difference of scale space D for the image may then be obtained by taking the difference between adjacent pairs of smoothened scale space levels ($L_i - L_{i-1}$). Normalization of the difference of scale space L is then achieved by dividing each difference of scale space level $D_i$ by a smoothened scale space level $L_k$ that is as smooth or smoother than the smoothest of the scale space levels $L_i$ used to obtain the particular difference of scale space level $D_i$.

Exemplary Object Recognition Process

FIG. 1 is a block diagram illustrating the functional stages for performing object recognition on a queried image. At an image capture stage 102, an image 108 of interest (i.e., the queried image) may be captured. The image 108 may be captured by an image capturing device, which may include one or more image sensors and/or an analog-to-digital converter, to obtain a digital captured image. The image sensors (e.g., charge coupled devices (CCD), complementary metal semiconductors (CMOS)) may convert light into electrons. The electrons may form an analog signal that is then converted into digital values by the analog-to-digital converter. In this manner, the image 108 may be captured in a digital format that may define the image I(x, y), for example, as a plurality of pixels with corresponding color, illumination, and/or other characteristics.

In an image processing stage 104, the captured image 108 is then processed by generating a corresponding scale space 110 (e.g., Gaussian scale space), performing feature detection 112, and performing feature descriptor extraction 116. Feature detection 112 may identify highly distinctive keypoints and/or keypoints of geometrical interest for the captured image 108 which can subsequently be used in feature descriptor extraction 116 to obtain a plurality of descriptors. At an image comparison stage 106, these descriptors are used to perform feature matching 122 (e.g., by comparing keypoints and/or other characteristics of keypoints or patches surrounding the keypoints) with a database of known descriptors. Geometric verification or consistency checking 124 is then performed on keypoint matches to ascertain correct feature matches and provide match results 126. In this manner a queried image may be compared to, and/or identified from, a database of target images.

It has been observed that changes in illumination in an image can have a deleterious impact on the stability and/or repeatability of feature/keypoint recognition for an image. That is, local and/or global illumination changes in an image may affect the detection of features/keypoints for an image. For instance, the number and/or location of features/keypoints may change depending on the illumination (e.g., shading, contrast, etc.) in an image. Therefore, it would be beneficial to substantially eliminate or minimize the effects of local and/or global illumination changes prior to feature/keypoint detection in an image.

One way to do this may be to process the image itself to remove or compensate for local and/or global illumination changes prior to starting feature/keypoint detection. However, such process may be computationally intensive. Additionally, it is often difficult to determine whether local and/or global illumination changes are present in an image. Such process would also have to be applied to images in a database. Without first processing both a target image and the database images to correct for illumination changes, feature/keypoint matching may not succeed. But without prior knowledge of how illumination may affect a particular image, this is process is rather difficult to implement automatically.

Therefore, an alternative is needed that can be performed without substantial processing overhead. According to one example, the effects of illumination (either uniform or non-uniform) across an image for the purpose of feature detection may be eliminated or reduced by normalizing a difference of scale space prior to feature/keypoint detection being performed on the difference of scale space. This normalization process may be performed using a smoothened scale space that is already available, therefore minimizing any additionally computation.

According to one example, a scale space normalizer 114 may be implemented as part of scale space generation 110 to reduce or eliminate the effects that illumination changes have on keypoint/feature recognition in an image.

Figure 2:
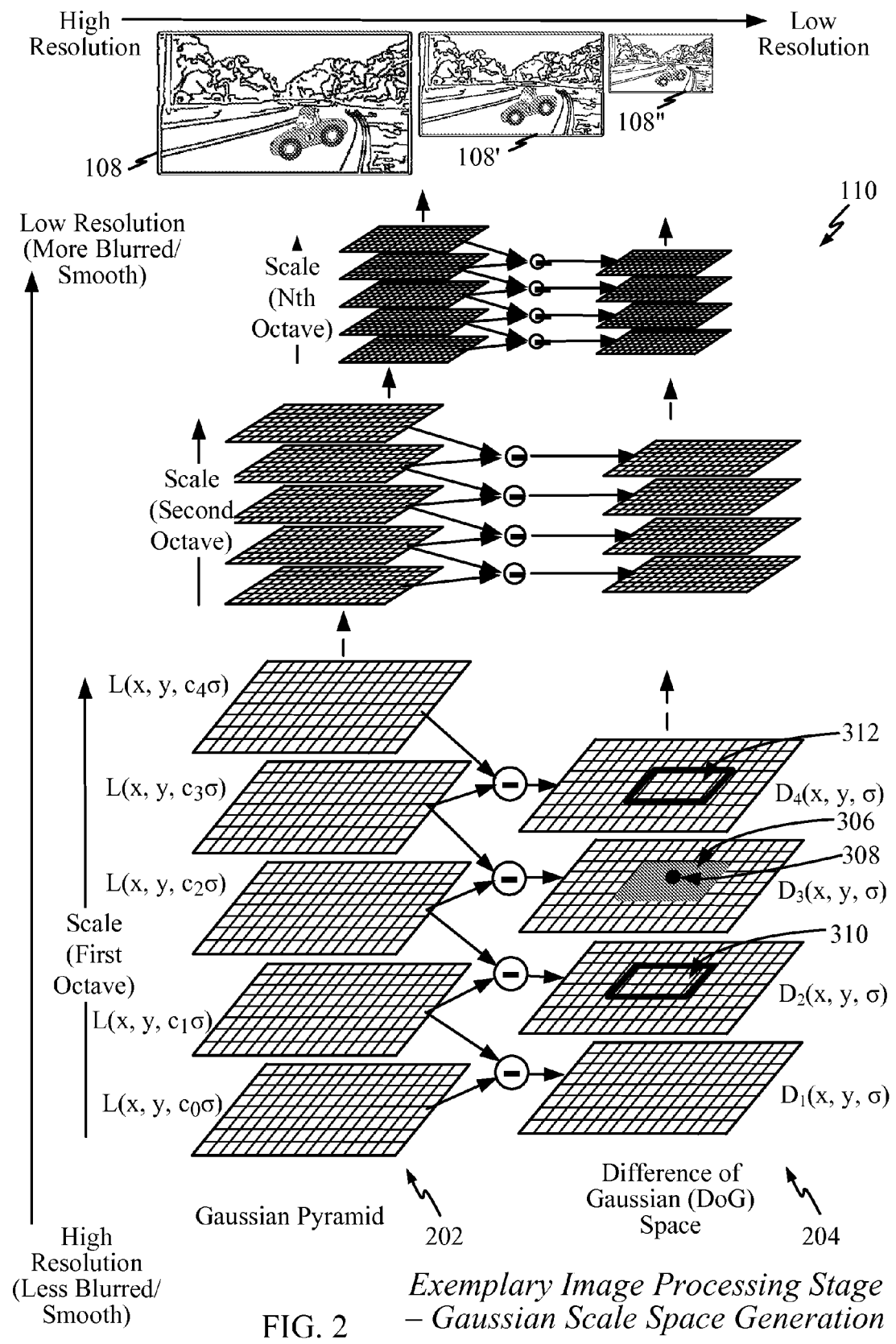
FIG. 2 illustrates Gaussian scale space generation in an exemplary image processing stage.

FIG. 2 illustrates Gaussian scale space generation in an exemplary image processing stage 104. A number of algorithms, such as Scale Invariant Feature Transform (SIFT), have been developed to perform feature detection in images. A first step towards detection of particular objects in an image is classifying the queried object based on its local features. The goal is to identify and select features that are invariant and/or robust to, for example, illumination, image noise, rotation, scaling, and/or small changes in viewpoint. That is, matches between a query image and a comparison target image should be found despite differences in illumination, image noise, rotation, scale, and/or viewpoint between the two images. One way to do this is to perform extrema detection (e.g., local maxima or minima) on patches of an image to identify highly distinctive features (e.g., distinctive points, pixels, and/or regions in the image).

SIFT is one approach for detecting and extracting local features that are reasonably invariant to changes in illumination, image noise, rotation, scaling, and/or small changes in viewpoint. The image processing stage 104 for SIFT may include: (a) scale-space extrema detection, (b) keypoint localization, (c) orientation assignment, and/or (d) generation of keypoint descriptors. It should be clear that alternative algorithms for feature detection and, subsequent feature descriptor generation, including Speed Up Robust Features (SURF), Gradient Location and Orientation Histogram (GLOH), Local Energy based Shape Histogram (LESH), Compressed Histogram of Gradients (CHoG), among others, may also benefit from the features described herein.

In Gaussian scale space generation 110, the digital image I(x, y) 108 is gradually Gaussian blurred (i.e., smoothened) to construct the Gaussian pyramid 202. Gaussian blurring (smoothing) generally involves convolving the original image I(x, y) with the Gaussian blurring/smoothing function $G(x, y, c\sigma)$ at scale $c\sigma$ such that the Gaussian blurring/smoothing function $L(x, y, c\sigma)$ is defined as $L(x, y, c\sigma)=G(x, y, c\sigma)*I(x, y)$. Here, G is a Gaussian kernel, $c\sigma$ denotes the standard deviation of the Gaussian function that is used for blurring the image I(x, y). As multiplier c, is varied ($c_0<c_1<c_2<c_3<c_4$), the standard deviation $c\sigma$ varies and a gradual blurring/smoothing is obtained. Sigma $\sigma$ is the base scale variable (e.g., the width of the Gaussian kernel). Higher scales (i.e., lower resolution) are blurred/smoothened more than lower scales (i.e., higher resolution). Thus, the wider scale levels (i.e., lower resolution), the smoother (more blurred) the image.

When the initial image I(x, y) is incrementally convolved with Gaussians G to produce the blurred images L, the blurred images L are separated by the constant factor c in the scale space. As the number of Gaussian blurred (smoothened) images L increase and the approximation provided for the Gaussian pyramid 202 approaches a continuous space, the two scales also approach one scale. In one example, the convolved images L may be grouped by octave, where an octave may correspond to a doubling of the value of the standard deviation $\sigma$. Moreover, the values of the multipliers c (e.g., $c_0<c_1<c_2<c_3<c_4 \ldots$), are selected such that a fixed number of convolved images L are obtained per octave. Each octave of scaling corresponds to an explicit image resizing. Thus, as the original image I(x,y) is blurred/smoothened by the gradually blurring/smoothening function, the number of pixels is progressively reduced. Note that while Gaussian smoothening functions are used herein for purposes of illustration, other types of smoothening kernels/functions may be employed.

A difference of Gaussian (DoG) pyramid 204 constructed by computing the difference of any two consecutive Gaussian-blurred images in the Gaussian pyramid 202. In the DoG space 204, $D(x, y, \sigma)=L(x, y, c_n\sigma)-L(x, y, c_{n-1}\sigma)$. A DoG image $D(x, y, \sigma)$ is the difference between two adjacent Gaussian blurred images L at scales $c_n\sigma$ and $c_{n-1}\sigma$. The scale of the $D(x, y, \sigma)$ lies somewhere between $c_n\sigma$ and $c_{n-1}\sigma$. The DoG images D may be obtained from adjacent Gaussian-blurred images L per octave. After each octave, the Gaussian image may be down-sampled by a factor of 2 and then the process is repeated. In this manner an image may be transformed into local features that are robust or invariant to translation, rotation, scale, and/or other image parameters and/or distortions.

Once generated, the DoG space 204 for a queried image may be utilized for extrema detection to identify features of interest (e.g., identify highly distinctive points in the image). These highly distinctive points are herein referred to as keypoints. These keypoints may be identified by the characteristics of a patch or local region surrounding each keypoint. A descriptor may be generated for each keypoint and its corresponding patch, which can be used for comparison of keypoints between a query image and stored target images. A "feature" may refer to a descriptor (i.e., a keypoint and its corresponding patch). A group of features (i.e., keypoints and corresponding patches) may be referred to as a cluster.

Figure 3:
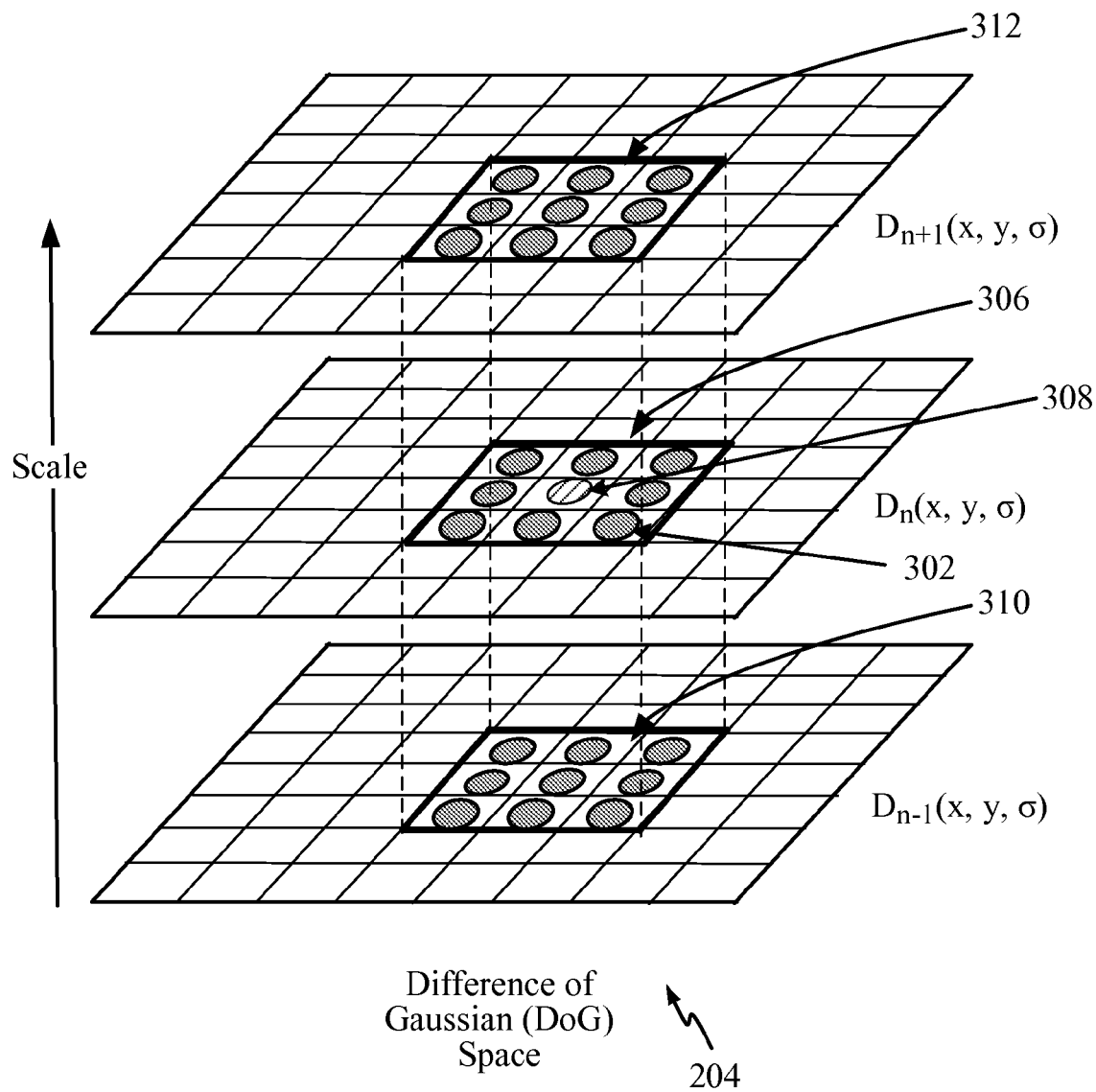
FIG. 3 illustrates feature detection in the exemplary image processing stage.

FIG. 3 illustrates feature detection in the exemplary image processing stage 104. In feature detection 112, the DoG space 204 may be used to identify keypoints for the image I(x, y). Feature detection 112 seeks to determine whether a local region or patch around a particular sample point or pixel in the image is a potentially interesting patch (geometrically speaking).

Generally, local maxima and/or local minima in the DoG space 204 are identified and the locations of these maxima and minima are used as keypoint locations in the DoG space 204. In the example illustrated in FIG. 3, a keypoint 308 has been identified with a patch 306. Finding the local maxima and minima (also known as local extrema detection) may be achieved by comparing each pixel (e.g., the pixel for keypoint 308) in the DoG space 204 to its eight neighboring pixels at the same scale and to the nine neighboring pixels (in adjacent patches 310 and 312) in each of the neighboring scales on the two sides of the keypoint 408, for a total of 26 pixels (9×2+8=26). Here, the patches are defined as 3×3 pixel regions. In general, if the pixel value for the keypoint 306 is a maximum or a minimum among all twenty-six (26) compared pixels in the patches 306, 310, and 308, then it is selected as a keypoint. The keypoints may be further processed such that their location is identified more accurately and some of the keypoints, such as the low contrast keypoints and edge keypoints may be discarded.

Figure 4:
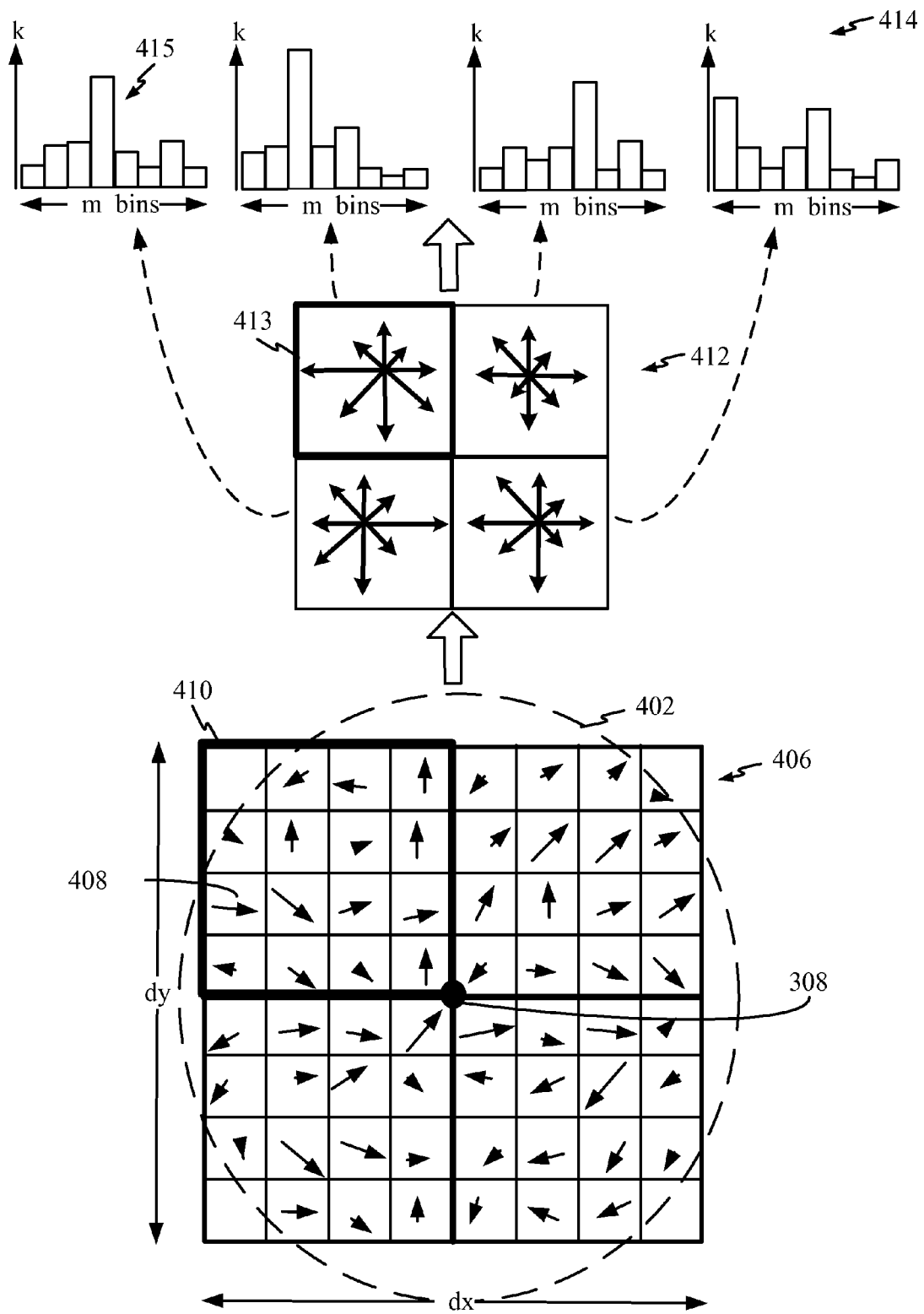
FIG. 4 illustrates feature descriptor extraction in the exemplary image processing stage.

FIG. 4 illustrates feature descriptor extraction in the exemplary image processing stage 104. Generally, a feature (e.g., a keypoint and its corresponding patch) may be represented by a descriptor, which allows for efficient comparison of the feature (from a query image) to features stored in a database of target images. In one example of feature descriptor extraction 116, each keypoint may be assigned one or more orientations, or directions, based on the directions of the local image gradient. By assigning a consistent orientation to each keypoint based on local image properties, the keypoint descriptor can be represented relative to this orientation and therefore achieve invariance to image rotation. Magnitude and direction calculations may be performed for every pixel in the neighboring region around the keypoint 308 in the Gaussian-blurred image L and/or at the keypoint scale. The magnitude of the gradient for the keypoint 308 located at (x, y) may be represented as m(x, y) and the orientation or direction of the gradient for the keypoint at (x, y) may be represented as Γ(x, y). The scale of the keypoint is used to select the Gaussian smoothed image, L, with the closest scale to the scale of the keypoint 308, so that all computations are performed in a scale-invariant manner. For each image sample, L(x, y), at this scale, the gradient magnitude, m(x, y), and orientation, Γ(x, y), are computed using pixel differences. For example the magnitude m(x,y) may be computed as:

$$m(x, y) = \sqrt{(L(x+1, y) - L(x-1, y))^2 + (L(x, y+1) - L(x, y-1))^2}.$$ (Equation 1)

The direction or orientation Γ(x, y) may be calculated as:

$$\Gamma(x, y) = \arctan\left[\frac{(L(x, y+1)L(x, y-1)}{(L(x+1, y) - L(x-1, y)}\right].$$ (Equation 2)

Here, L(x, y) is a sample of the Gaussian-blurred image L(x, y, σ), at scale σ which is also the scale of the keypoint.

The gradients for the keypoint 308 may be calculated consistently either for the plane in the Gaussian pyramid that lies above, at a higher scale, than the plane of the keypoint in the DoG space or in a plane of the Gaussian pyramid that lies below, at a lower scale, than the keypoint. Either way, for each keypoint, the gradients are calculated all at one same scale in a rectangular area (e.g., patch) surrounding the keypoint. Moreover, the frequency of an image signal is reflected in the scale of the Gaussian-blurred image. Yet, SIFT simply uses gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, a vector of gradient orientations may be generated (in SIFT) in the neighborhood of the keypoint 308 (using the Gaussian image at the closest scale to the keypoint's scale). However, keypoint orientation may also be represented by a gradient orientation histogram (see FIG. 4) by using, for example, Compressed Histogram of Gradients (CHoG). The contribution of each neighboring pixel may be weighted by the gradient magnitude and a Gaussian window. Peaks in the histogram correspond to dominant orientations. All the properties of the keypoint may be measured relative to the keypoint orientation, this provides invariance to rotation.

In one example, the distribution of the Gaussian-weighted gradients may be computed for each block where each block is 2 sub-blocks by 2 sub-blocks for a total of 4 sub-blocks. To compute the distribution of the Gaussian-weighted gradients, an orientation histogram with several bins is formed with each bin covering a part of the area around the keypoint. For example, the orientation histogram may have 36 bins, each bin covering 10 degrees of the 360 degree range of orientations. Alternatively, the histogram may have 8 bins each covering 45 degrees of the 360 degree range. It should be clear that the histogram coding techniques described herein may be applicable to histograms of any number of bins. Note that other techniques may also be used that ultimately generate a histogram.

Gradient distributions and orientation histograms may be obtained in various ways. For example, a two-dimensional gradient distribution (dx, dy) (e.g., block 406) is converted to a one-dimensional distribution (e.g., histogram 414). The keypoint 408 is located at a center of a patch 406 (also called a cell or region) that surrounds the keypoint 408. The gradients that are pre-computed for each level of the pyramid are shown as small arrows at each sample location 408. As shown, 4×4 regions of samples 408 form a sub-block 410 and 2×2 regions of sub-blocks form the block 406. The block 406 may also be referred to as a descriptor window. The Gaussian weighting function is shown with the circle 402 and is used to assign a weight to the magnitude of each sample point 408. The weight in the circular window 402 falls off smoothly. The purpose of the Gaussian window 402 is to avoid sudden changes in the descriptor with small changes in position of the window and to give less emphasis to gradients that are far from the center of the descriptor. A 2×2=4 array of orientation histograms 412 is obtained from the 2×2 sub-blocks with 8 orientations in each bin of the histogram resulting in a (2×2)× 8=32 dimensional feature descriptor vector. For example, orientation histograms 413 and 415 may correspond to the gradient distribution for sub-block 410. However, using a 4×4 array of histograms with 8 orientations in each histogram (8-bin histograms), resulting in a (4×4)×8=128 dimensional feature descriptor vector for each keypoint may yield a better result. Note that other types of quantization bin constellations (e.g., with different Voronoi cell structures) may also be used to obtain gradient distributions.

As used herein, a histogram is a mapping $k_i$ that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram $k_i$ satisfy the following condition:

$$n = \sum_{i=1}^{m} k_i, \quad \text{(Equation 3)}$$

where $\Sigma$ is the summation operator.

The histograms from the sub-blocks may be concatenated to obtain a feature descriptor vector for the keypoint. If the gradients in 8-bin histograms from 16 sub-blocks are used, a 128 dimensional feature descriptor vector may result.

In this manner, a descriptor may be obtained for each keypoint identified, where such descriptor may be characterized by a location (x, y), an orientation, and a descriptor of the distributions of the Gaussian-weighted gradients. Note that an image may be characterized by one or more keypoint descriptors (also referred to as image descriptors). Additionally, a descriptor may also include a location information (e.g., coordinates for the keypoint), a scale (e.g., Gaussian scale at with the keypoint was detected), and other information such as a cluster identifier, etc.

By operating in the difference of Gaussian space 204, any level shifts in the luminance (spatially uniform additive bias to the luminance) of an image are entirely ignored. But scale shifts in luminance will impact the way in which keypoints are judged and ultimately selected or rejected. This applies to both uniform as well as spatially varying multiplicative luminance factors. Just as important as the keypoint detection is its localization within an image. An object is categorized by the geometric contents of its features and their spatial interrelationships. Therefore, the computed location of the keypoint is an important element so that even if the keypoint is detected, its localization should be computed in an invariant way with respect to any luminance scale changes.

Consequently, prior to identifying keypoints and generating descriptors, one feature provides for normalizing the difference of Gaussian space 204 in order to reduce, remove, and/or filter the influence of illumination from the scale space in which the keypoints are detected.

Exemplary Difference of Scale Space Normalization

Figure 5:
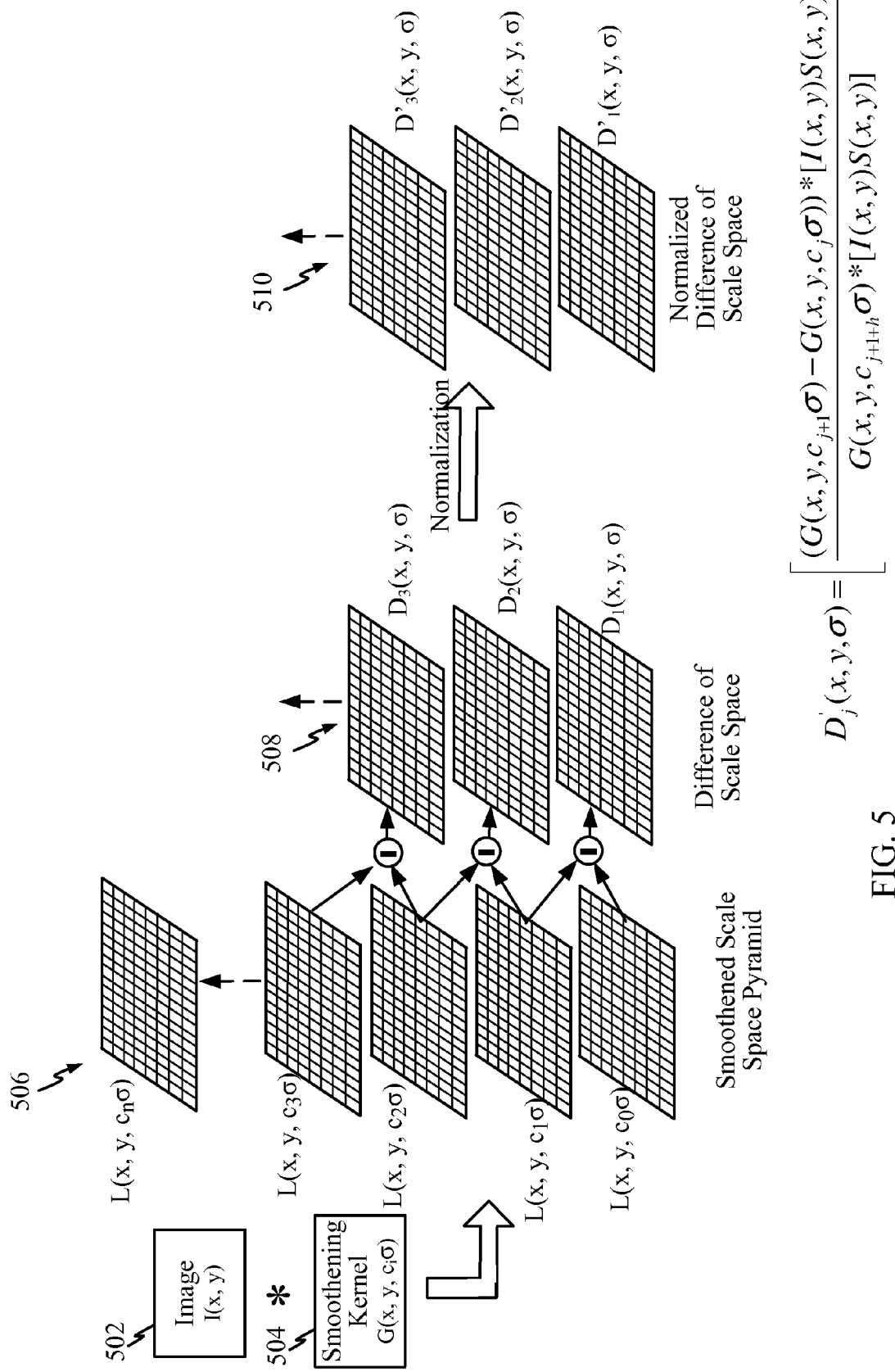
FIG. 5 illustrates an example of scale space normalization for illumination invariant feature/keypoint detection.

FIG. 5 illustrates an example of scale space normalization for illumination invariant feature/keypoint detection. An image I(x, y) 502 may be convolved with a smoothening kernel $G(x, y, c_i\sigma)$ 504 at different scales $c_i\sigma$ to generate a smoothened scale space pyramid 506, where i is an integer between 0 and n. Note that the smoothening kernels may be a Gaussian kernel and/or other types of smoothening functions. The difference between two adjacent scale spaces of the smoothened scale space pyramid 506 may be taken to obtain a difference of scale space 508.

It is first observed that each level of the difference of scale space 508 may be defined as the difference of the smoothening kernel at different scales 504 (e.g., $G(x, y, c_{j+1}\sigma)-G(x, y, c_j\sigma)$) convolved with the image I(x, y) 502. This is equal to the difference of two corresponding smoothened scale spaces (e.g., $L(x, y, c_{j+1}\sigma)-L(x, y, c_j\sigma)$). Therefore, the difference of two smoothening scale spaces may be represented as:

$$D(x,y,\sigma)=(G(x,y,c_{j+1}\sigma)-G(x,y,c_j\sigma))*I(x,y)=L(x,y,c_{j+1}\sigma)-L(x,y,c_j\sigma) \quad \text{(Equation 4)}$$

It is also observed that if illumination is represented as a scaling function S(x, y), then illumination changes for a difference of two smoothening scale spaces may be represented as:

$$D(x,y,\sigma)=(G(x,y,c_{j+1}\sigma)-G(x,y,c_j\sigma))*(I(x,y)S(x,y)) \quad \text{(Equation 5)}$$

Here, in the general case, the illumination scaling function S(x, y) may be spatially varying or spatially constant.

However, it is not practical and/or feasible to model illumination in runtime to obtain the illumination scaling function S(x,y). Therefore, an alternative approach is disclosed herein that brings out the underlying feature (e.g., keypoint) which is unbiased by illumination from the feature space (e.g., DoG Space 508) on which feature selection and/or pruning is typically performed. According to this alternative approach, the luminance distribution of the image I(x, y) 502 is normalized by making use of scale space information that is extracted from the image I(x, y) 502. No prior information about the illumination is needed. This method enables choosing stable features and increase repeatability on a consistent level across different illumination changes without introducing any major computation and processing.

To do this, the difference of scale space 508 on which feature detection takes place may be normalized by a wider scale space. This approach may be defined by:

$$D'(x, y, \sigma) = \left[ \frac{[G(x, y, c_{j+1}\sigma) - G(x, y, c_j\sigma)] * [I(x, y)S(x, y)]}{G(x, y, c_{j+1+h}\sigma) * [I(x, y)S(x, y)]} \right] \quad \text{(Equation 6)}$$

where a first Gaussian smoothening kernel $G(x, y, c_{j+1}\sigma)$ is wider than a second Gaussian smoothening kernel $G(x, y, c_j\sigma)$ (i.e., scale $c_{j+1}\sigma$ is wider than scale $c_j\sigma$, where j is a positive integer between 0 and n);

I(x, y) is the image being processed or a derivative thereof (e.g., reflective property of image);

S(x, y) an illumination scaling function; and $G(x, y, c_{j+1+h}\sigma)$ is a third smoothening kernel having a scale space that is as wide or wider than the second smoothening kernel $G(x, y, c_{j+1}\sigma)$, where h is a positive integer between 0 and n. By repeating this process on every level of the difference of scale space 508, a normalized difference of scale space 510 may be generated. For example, for a differential scale space defined by $G(x, y, c_{j+1}\sigma)$ and $G(x, y, c_{j+2}\sigma)$, the normalizing function may be $G(x, y, c_{j+1}\sigma)$ or anything higher (i.e., $G(x, y, c_{j+2}\sigma)$, $G(x, y, c_{j+3}\sigma)$, ... ). The normalizing function need not be greater than both the smoothening kernels used in the differential scale space, it just needs to be as smoother. In another example, the normalizing function may be the sum of the first and second smoothening kernels used (i.e., $G(x, y, c_{j+1}\sigma)+G(x, y, c_j\sigma)$) such that:

$$D'(x, y, \sigma) = \left[ \frac{[G(x, y, c_{j+1}\sigma) - G(x, y, c_j\sigma)] * [I(x, y)S(x, y)]}{[G(x, y, c_{j+1}\sigma) + G(x, y, c_j\sigma)] * [I(x, y)S(x, y)]} \right].$$ (Equation 7)

Note that Equation 6 may also be represented as:

$$D'(x, y, \sigma) = \left[ \frac{[L(x, y, c_{j+1}\sigma) - L(x, y, c_j\sigma)] * S(x, y)}{L(x, y, c_{j+1+h}\sigma) * S(x, y)} \right]$$ (Equation 8)

Because the illumination scaling function S(x, y) appears in both the numerator and denominator (of Equations 6, 7 and 8), its scaling effect is cancelled out. That is, because the illumination scaling function S(x, y) is present in the smoothened image $L(x, y, c_{j+1+h}\sigma)$*S(x, y) used for normalization, it completely or substantially cancels out the effect of illumination scaling function S(x, y) in the difference of scale space $[L(x, y, c_{j+1}\sigma) - L(x, y, c_j\sigma)]$*S(x, y). As before $L(x, y, c_{j+1+h}\sigma)$ may be equal to $L(x, y, c_{j+1}\sigma)$ or a higher scale image (i.e., $L(x, y, c_{j+2}\sigma)$, $L(x, y, c_{j+3}\sigma)$, ...). In this manner, the image content in the denominator is smoothed to such an extent that it introduces very little spatial artifacts.

In normalizing the difference of scale space, the normalizing smoothened image $L(x, y, c_{j+1+h}\sigma)$ should be selected so as not to change the feature space (i.e., difference of scale space) too much so as not to shift the local extrema positions (which identify keypoints/features). That is, a close approximation of the difference of scale space should be retained after normalization since it is known that a difference of scale space is best to achieve scale invariant features. To this end, the smoothened image $L(x, y, c_{j+1+h}\sigma)$ is selected such that its scale level is sufficient smooth so that high frequency contents are averaged out. That is, if the smoothened image $L(x, y, c_{j+1+h}\sigma)$ is sufficiently flat, then the shape of the difference of scale space $L(x, y, c_{j+1}\sigma)-L(x, y, c_j\sigma)$ is largely unchanged (i.e., position of features/keypoints are unchanged. Note that, in one embodiment, selecting a normalizing function at a scale level that is close (the same as or next highest) to the scale levels used to obtain the differential scale level being normalized may be preferred since this avoids introducing too much noise. For example, by picking a smooth scale like $G(x, y, c_{j+1}\sigma)$ for a differential scale space defined by $G(x, y, c_{j+1}\sigma)$ and $G(x, y, c_j\sigma)$, the local irregularities typical for that particular level in scale space may be preserved.

As previously noted, the number of the features detected in an image may be greatly affected (e.g., reduced) by the multiplicative luminance scale changes in the image. Scaling caused by luminance tends to act like a mask on the image, which drastically reduces the content in the final feature space even without any geometrical transformations. Thus, the normalization achieved by application of Equations 6 and 7 makes sure that features that are "equal" in their geometric significance are detected irrespective of illumination changes, thereby increasing repeatability.

Figure 6:
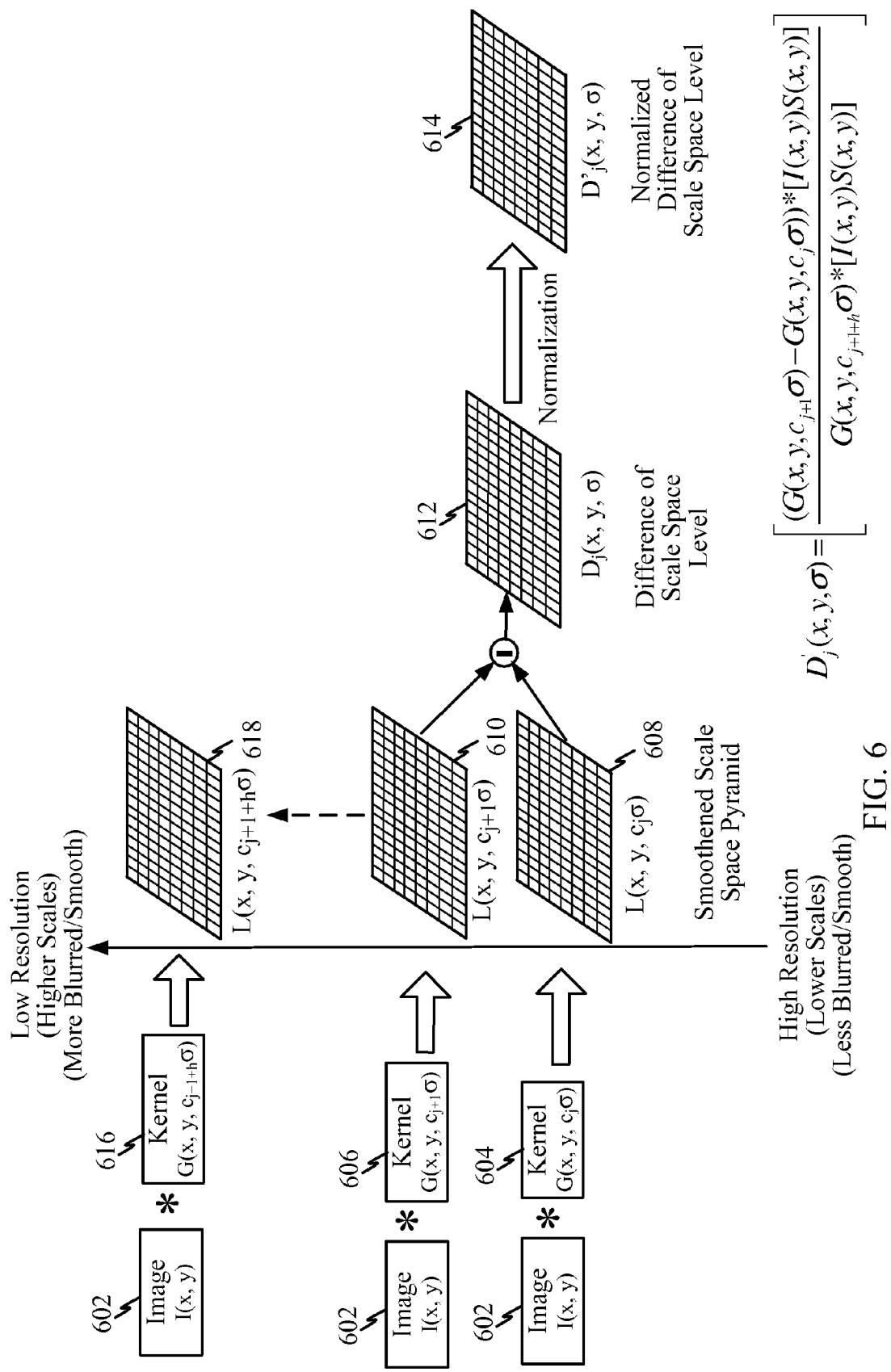
FIG. 6 illustrates one example how one level of a normalized difference of scale space may be obtained.

FIG. 6 illustrates one example how one level of a normalized difference of scale space may be obtained. Here, an image I(x, y) 602 may be convolved with a first smoothening kernel $G(x, y, c_j\sigma)$ to obtain a first smoothened scale space image $L(x, y, c_j\sigma)$ 608. The image I(x, y) 602 may also be convolved with a second smoothening kernel $G(x, y, c_{j+1}\sigma)$ 606 to obtain a second smoothened scale space image $L(x, y, c_{j+1}\sigma)$ 610. A difference between the second and first smoothened images 610 and 608 may be taken to obtain a difference of scale space level $D_j(x, y, \sigma)$ 612. This difference of scale space level $D_j(x, y, \sigma)$ 612 may be normalized (i.e., according to Equation 6 and/or 7) based on a higher scale smoothening kernel $G(x, y, c_{j+1+h}\sigma)$ 616 or smoothened scale space image $L(x, y, c_{j+1+h}\sigma)$ 618 to obtain a normalized scale space level $D'_j(x, y, \sigma)$ 614. This process may be repeated by applying different smoothening kernels of different widths (set by scaling factors $c_j\sigma$) to the image I(x, y), thereby building a smoothened scale space pyramid. A difference of scale space (e.g., 508 in FIG. 5) may be built by taking the difference between adjacent levels of the smoothened scale space pyramid (e.g., 506 in FIG. 5). A normalized difference of scale space (e.g., 510 in FIG. 5) may be generated, according to Equations 6 and/or 7.

Figure 7:
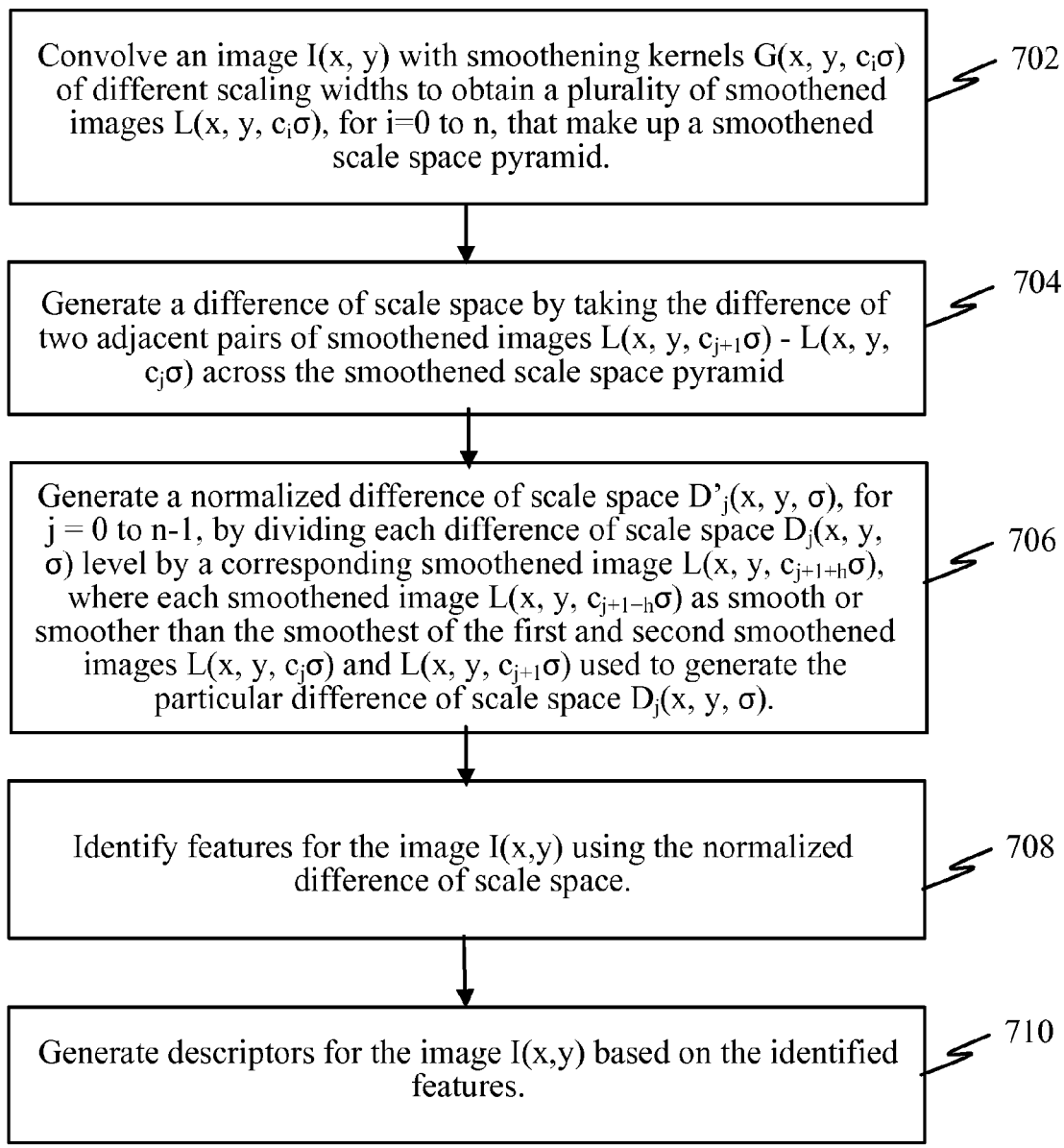
FIG. 7 illustrates a method for generating a normalized difference of scale space for improved feature detection that is resistant to changes in illumination.

FIG. 7 illustrates a method for generating a normalized difference of scale space for improved feature detection that is resistant to changes in illumination. Convolve an image I(x, y) with smoothening kernels $G(x, y, c_i\sigma)$ of different scaling widths (set by different $c_i\sigma$, for i=0 to n) to obtain a plurality of smoothened images $L(x, y, c_i\sigma)$, for i=0 to n, that make up a smoothened scale space pyramid 702. Note that the image I(x,y) may be represented by an original image 4) multiply the image space I(x,y) with an illumination scaling function S(x, y) to obtain a scaled image space $I_0(x,y)$ multiplied by a spatially varying illumination function S(x,y). That is, the image I(x, y) may be characterized by a base image $I_0(x, y)$ that has been modified, completely or on a pixel-by-pixel basis, by the illumination function S(x,y). In one example, the smoothening kernels $G(x, y, c_i\sigma)$ may be Gaussian kernels such that the smoothened scale space pyramid is a Gaussian scale space pyramid.

Next, generate a difference of scale space $D_j(x, y, \sigma)$, for j=0 to n−1, by taking the difference of adjacent pairs of smoothened images $L(x, y, c_{j+1}\sigma)-L(x, y, c_j\sigma)$ across the smoothened scale space pyramid 704. This process is repeated for multiple sets of adjacent smoothened images to obtain the difference of scale space having multiple levels. Note that a second smoothening kernel $G(x, y, c_{j+1}\sigma)$, used to obtain the second smoothened image $L(x, y, c_{j+1}\sigma)$, may be wider than the first smoothening kernel $G(x, y, c_j\sigma)$ used to obtain the first smoothened image $L(x, y, c_{j+1}\sigma)$.

A normalized difference of scale space $D'_j(x, y, \sigma)$, for j=0 to n−1, may then be generated by dividing each difference of scale space $D_j(x, y, \sigma)$ level by a corresponding smoothened image $L(x, y, c_{j+1+h}\sigma)$, where each smoothened image $L(x, y, c_{j+1+h}\sigma)$ is as smooth or smoother than the smoothest of the two different smoothened versions of the image $L(x, y, c_{j+1}\sigma)$ and $L(x, y, c_j\sigma)$ 706. That is, the normalizing smoothened image $L(x, y, c_{j+1+h}\sigma)$ may have an equal or wider scale (e.g., smoothening kernel) than the greater of the scales (e.g., smoothening kernels) for the two different smoothened versions of the image $L(x, y, c_{j+1}\sigma)$ and $L(x, y, c_j\sigma)$.

The normalized difference of scale space $D'_j(x, y, \sigma)$, for j=0 to n−1, may then be used to identify features for the image I(x, y) 708. For example, local extrema (i.e., minima or maxima) may be identified as a keypoint around which a feature may be defined. Descriptors may then be generated for the image I(x, y) based on the identified features 710.

The method illustrated in FIGS. 5, 6, and 7 require no prior information about the illumination of an image. This method enables choosing stable features in an image and increase repeatability on a consistent level across different illumination changes without introducing any major (significant) computation and processing. That is, because the smoothened scale space already includes the smoothened image $L(x, y, c_{j+1+h}\sigma)$ used to normalize a difference of scale space $D_j(x, y, \sigma)$, no additional processing is needed for normalization aside from a division operation.

Additionally, by adapting the confidence with which features are selected, more stable features may be obtained according to the scale (e.g., smoothening level) at which the features is detected. That is, higher scales are generally include a smoother version of the image (i.e., more blurred) and keypoints/features detected at such scales have a higher degree of confidence.

Exemplary Feature Detection Examples

Figure 8A:
FIG. 8 (comprising FIGS. 8A, 8B, and 8C) illustrate how feature detection for an image may be affected due to changes in illumination using traditional feature detection approaches.
Figure 8B:
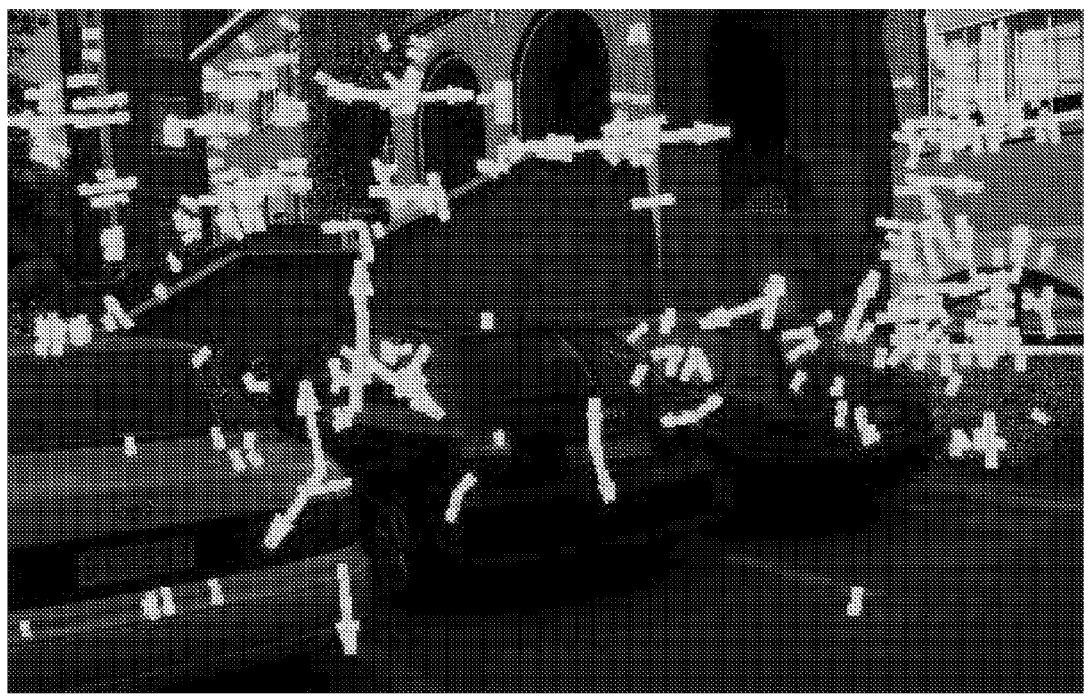
Figure 8C:

FIG. 8 (comprising FIGS. 8A, 8B, and 8C) illustrate how feature detection for an image may be affected due to changes in illumination using traditional feature detection approaches. FIG. 8A illustrates features detected in an image with an approximately uniform illumination. FIG. 8B illustrates features detected in an image with a uniform illumination scaling throughout the image to a low level. That is, relative to FIG. 8A, the image in FIG. 8B has fewer features detected throughout the image due to the illumination scaling (e.g., darkening of the image). FIG. 8C illustrates more vividly how spatially varying (non-uniform) illumination scaling can impact feature detection. That is, relative to FIG. 8A, the image in FIG. 8C has fewer features detected along the bottom half of the image which has been affected by illumination scaling (e.g., darkening of the image). For FIG. 8, it is clear that, the number of the features detected depend on the multiplicative luminance scale changes in the image.

Figure 9A:
FIG. 9 (comprising FIGS. 9A, 9B, and 9C) illustrate how normalizing a difference of scale space prior to feature detection helps to detect more features as compared to FIG. 8 regardless of illumination changes.
Figure 9B:
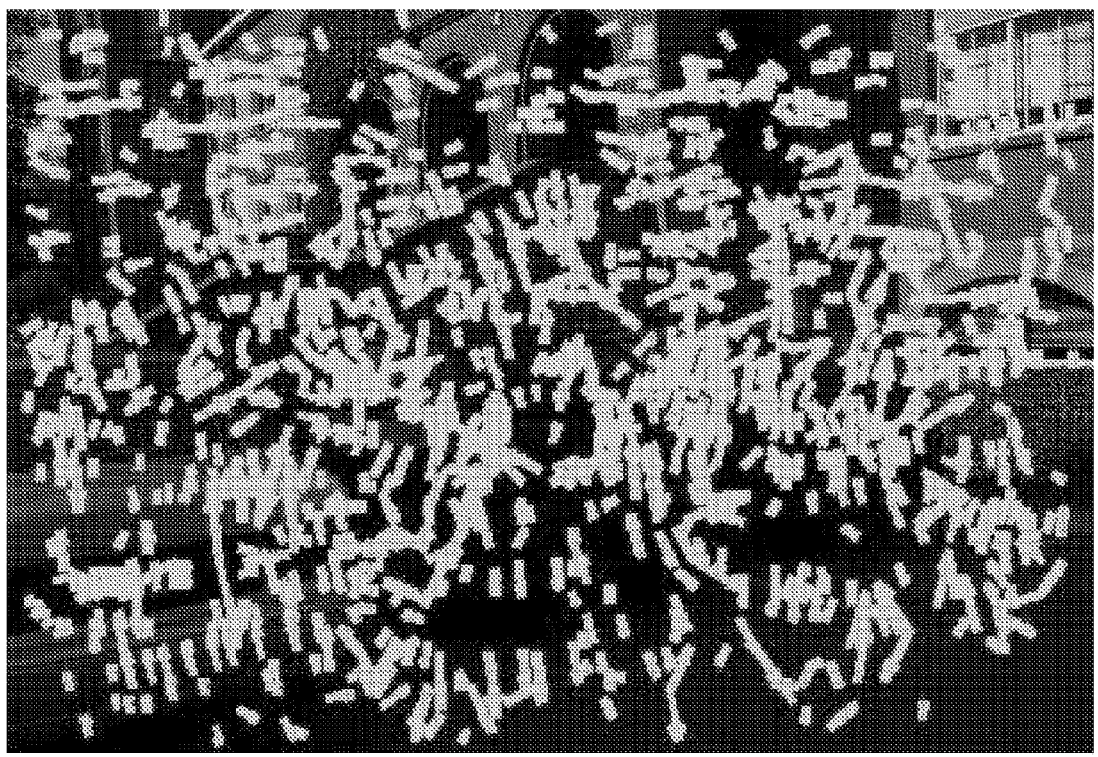
Figure 9C:
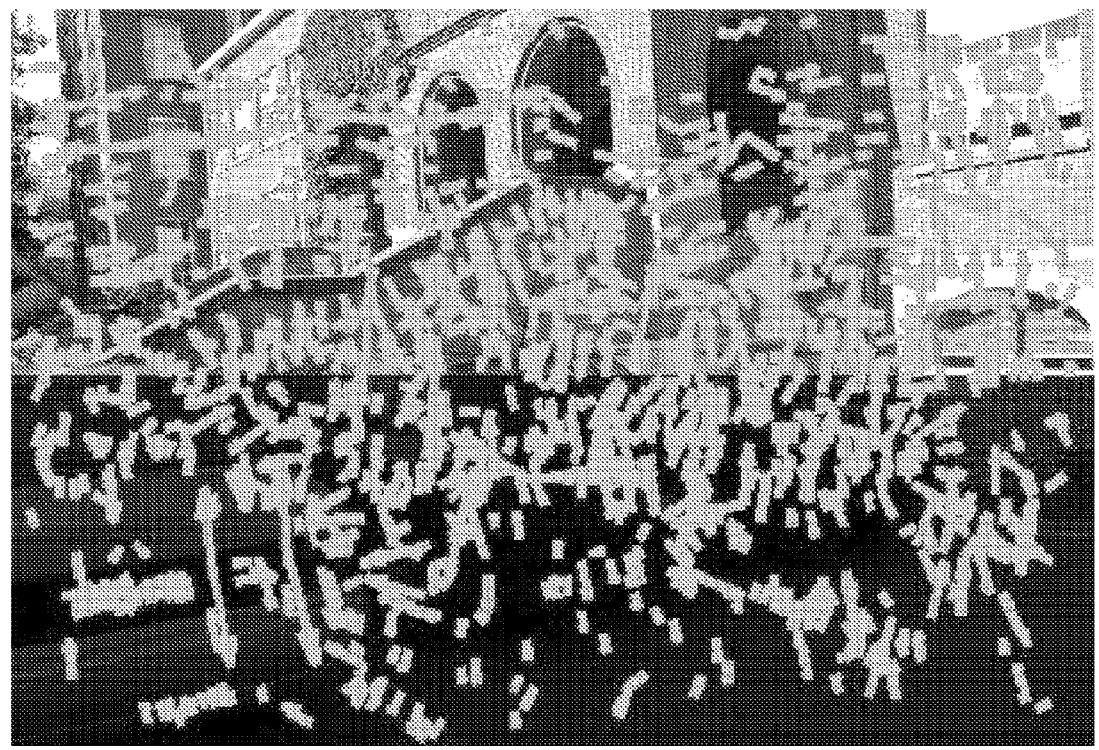

FIG. 9 (comprising FIGS. 9A, 9B, and 9C) illustrate how normalizing a difference of scale space prior to feature detection helps to detect features regardless of illumination changes. FIG. 9A illustrates features detected in an image with an approximately uniform illumination when a difference of scale space (in which features are detected) has been normalized first. FIG. 9B illustrates features detected in an image with a uniform illumination scaling throughout the image to a low level when a difference of scale space (in which features are detected) has been normalized first. As a result of such normalization, approximately the same feature density is detected in the FIG. 9A and FIG. 9B, despite the illumination scaling (e.g., darkening of the image) of FIG. 9B. FIG. 9C illustrates how normalizing a difference of scale space in which features are detected permits stable or repeatable feature detection despite spatially varying illumination changes. As a result of such normalization, approximately the same feature density is detected in the FIG. 9A and FIG. 9C, despite the spatially varying illumination scaling (e.g., darkening of the bottom half of the image) of FIG. 9C. From FIGS. 9A, 9B, and 9C, it can be appreciated that the disclosed technique of normalizing a difference of scale space (e.g., difference of Gaussian space) prior to feature detection largely cancels or reduces the effects of illumination changes.

Figure 10A:
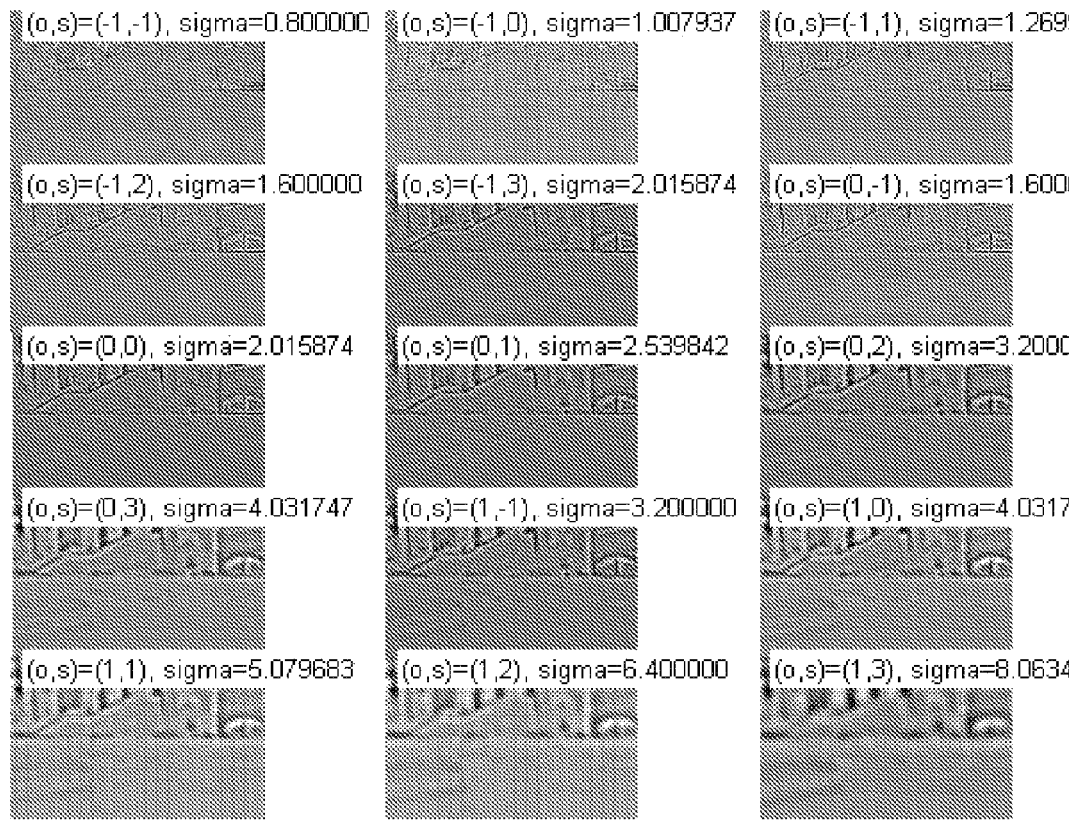
FIG. 10 (comprising FIGS. 10A and 10B) illustrate a comparison between a difference of Gaussian scale space and a normalized difference of Gaussian scale space.
Figure 10B:
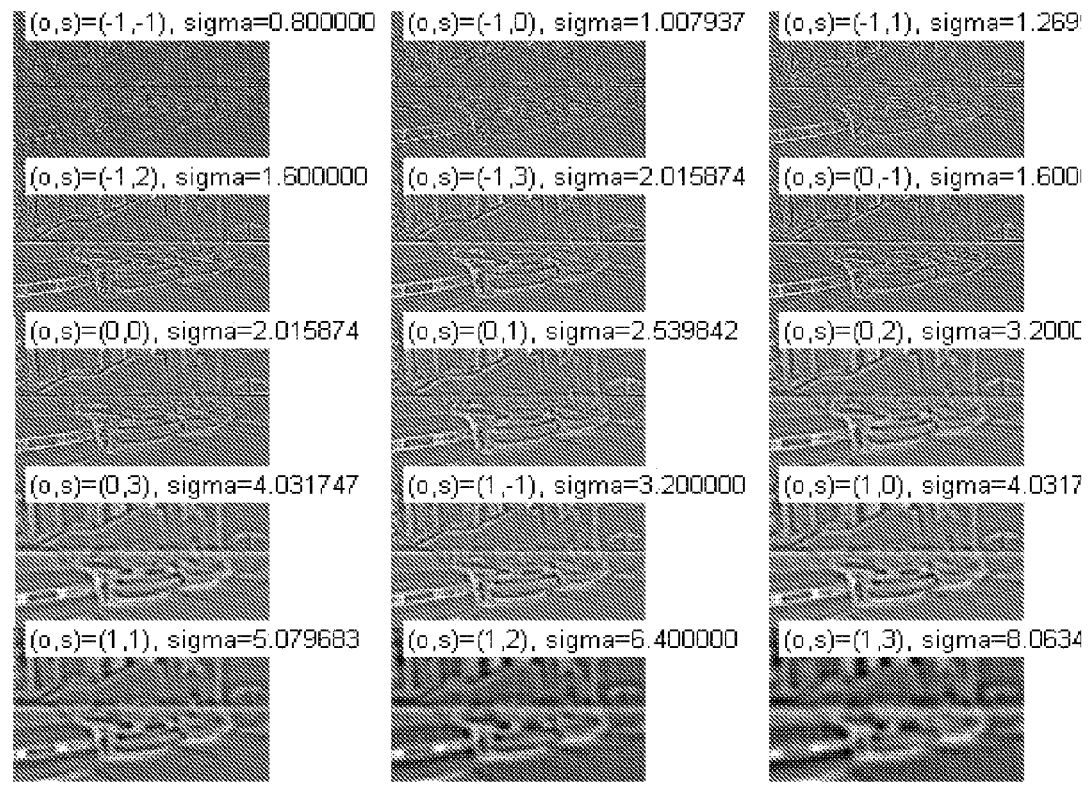

FIG. 10 (comprising FIGS. 10A and 10B) illustrate a comparison between a difference of Gaussian scale space and a normalized difference of Gaussian scale space. FIG. 10A illustrates a difference of Gaussian scale space comprising having a plurality of images (at different octaves, scales, and scaling widths), each of the images being a different smoothened version of an original image. FIG. 10A clearly shows the deleterious impact of luminance scale changes on the recognition of features. FIG. 10B illustrates the same difference of Gaussian scale space as in FIG. 10A that has been normalized according to the technique illustrated in FIGS. 5, 6, and 7. FIG. 10B shows more features that are clearly identifiable in spite of the luminance scale changes.

FIG. 11 (comprising FIGS. 11A and 11B) illustrates the impact that difference of scale space normalization has on keypoint matching verification. FIG. 11A illustrates how keypoints in a test image 1104, affected by uniform illumination scaling, are matched to a database image 1102 without normalization of the difference of scale space (e.g., DoG space). Here, approximately 144 keypoints are matched between the test image 1104 and the database image 1102. FIG. 11B illustrates how keypoints in a test image 1106, affected by uniform illumination scaling, are matched to a database image 1102 with normalization of the difference of scale space (e.g., normalized DoG space). Normalization results in approximately 495 keypoint matches, a significant improvement in comparison to the 144 keypoint matches of FIG. 11A.

Exemplary Feature Detection Device

Figure 12:
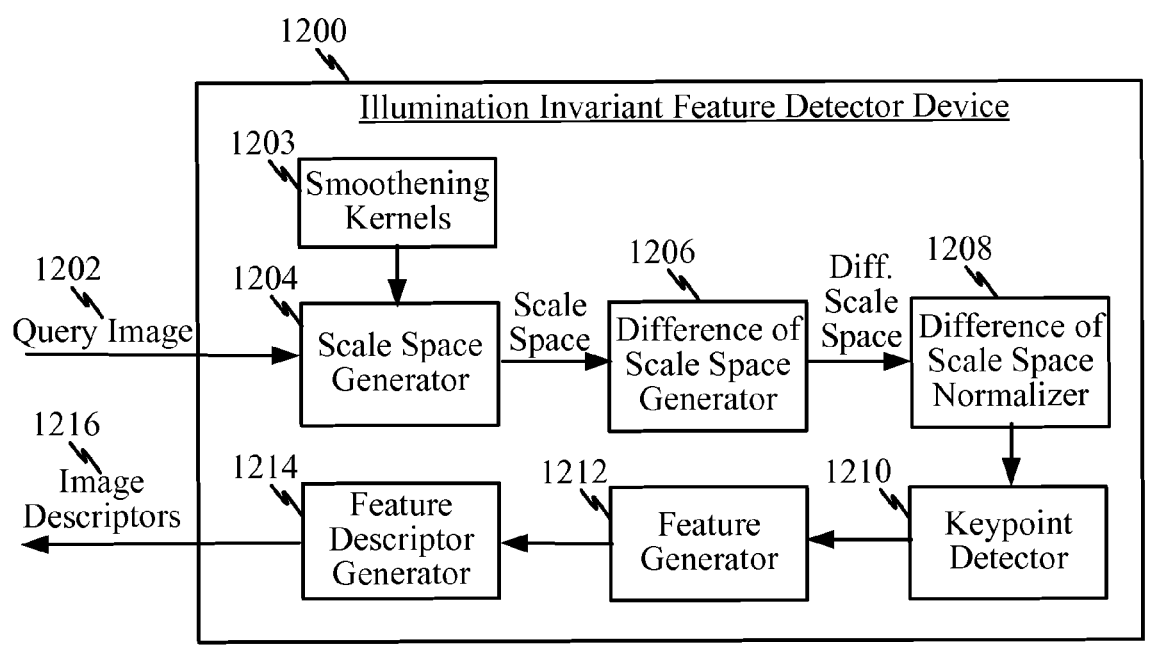
FIG. 12 is a block diagram illustrating an example of an illumination invariant feature detection device.

FIG. 12 is a block diagram illustrating an example of an illumination invariant feature detection device. The feature detection device 1200 may receive or obtain a digital query image 1202. A scale space generator 1204 (e.g., Gaussian scale space generator) may then convolve the query image 1202 with a plurality of different smoothening kernels 1203 of different scale widths to generate a scale space. The scale space may comprise a plurality of smoothened versions of the image that are smoothened to different scaling widths. A difference of scale space generator 1206 then generates a difference of scale space from the scale space. A difference of scale space normalizer 1208 then normalizes the difference of scale space by, for example, dividing each difference of scale space level by a corresponding smoothened image, where such smoothened image is has a scale that is as wide or wider than the greater of the smoothened images used to generate the difference of scale space being divided. A keypoint generator 1210 then identifies or detects keypoints in the normalized difference of scale space. This may be done, for example, by finding local extrema (i.e., maxima or minima) among pixels of the normalized difference of scale space. A feature generator 1212 may then generate features by, for example, characterizing local pixels around the identified keypoint. Note that the functions of the keypoint generator 1210 and feature generator 1212 may be performed by a feature detector. A feature descriptor generator 1214 then generates a descriptor for each feature to provide a plurality of image descriptors 1216 that can serve to identify the query image. The functions illustrated in FIG. 12 may be performed by separate circuits or by one or more processors.

Exemplary Image Matching Device

Figure 13:
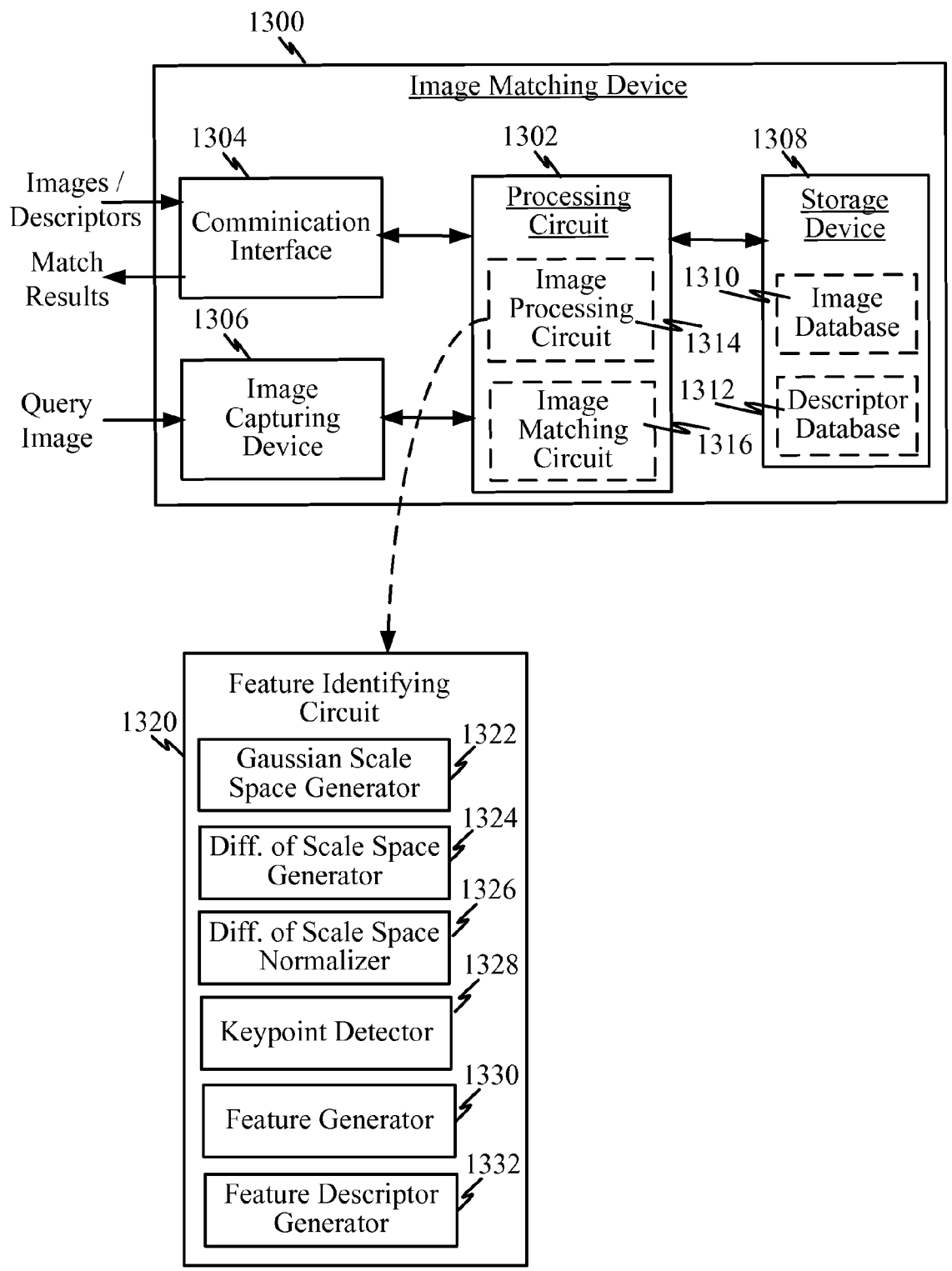
FIG. 13 is a block diagram illustrating an example of an image matching device that uses a normalized difference of scale space for feature detection.

FIG. 13 is a block diagram illustrating an example of an image matching device that uses a normalized difference of scale space for feature detection. The image matching device 1300 may include a processing circuit 1302, coupled to a communication interface 1304, an image capturing device 1306, and/or a storage device 1308. The communication interface 1304 may be adapted to communicate over a wired/wireless network and receive images and/or feature descriptors for one or more images. The image capturing device 1306 may be, for example, a digital camera that can capture a query image. The processing circuit 1302 may include an image processing circuit 1314 to extract features from images and an image matching circuit 1316 that uses the extracted features to match a query image to a database of target images 1310 and/or query image descriptors to a descriptor database 1312. According to one exemplary implementation, an image matching application attempts to match a query image to one or more images in an image database. The image database may include millions of feature descriptors associated with the one or more images stored in the database 1310.

The image processing circuit 1314 may include a feature identifying circuit 1320 that includes a Gaussian scale space generator 1322, a difference of scale space generator 1324, a difference of scale space normalizer 1326, a keypoint detector 1328, a feature generator 1330, and/or a feature descriptor generator 1332. The Gaussian scale space generator 1322 may serve to convolve an image with a blurring function (e.g., smoothening kernel) to generate a plurality of different scale spaces as illustrated, for example, in FIGS. 2 and 5. The difference of scale space generator 1324 then generates a difference of scale space from the scale space. The difference of scale space normalizer 1326 then normalizes the difference of scale space by, for example, dividing each difference of scale space level by a corresponding smoothened image, where such smoothened image is wider than either the smoothened images used to generate the difference of scale space being divided (illustrated in FIG. 6). The keypoint generator 1328 then identifies or detects keypoints in the normalized difference of scale space (illustrated in FIG. 9). This may be done, for example, by finding local extrema (i.e., maxima or minima) among pixels of the normalized difference of scale space. The feature generator 1330 may then generate features by, for example, characterizing local pixels around the identified keypoint (illustrated in FIG. 3). The feature descriptor generator 1332 then generates a descriptor for each feature to provide a plurality of image descriptors that can serve to identify the query image (illustrated in FIG. 4).

The image matching circuit 1316 may then attempt to match the query image to an image in the image database 1310 based on the feature descriptors. A match result may be provided via the communication interface (e.g., to a mobile device that sends the image or feature descriptors).

Note that, in some implementations, a set of feature descriptors associated with keypoints for a query image may be received by the image matching device. In this situation, the query image has already been processed (to obtain the descriptors). Therefore, the image processing circuit 1314 may be bypassed or removed from the image matching device 1300.

Exemplary Mobile Device

Figure 14:
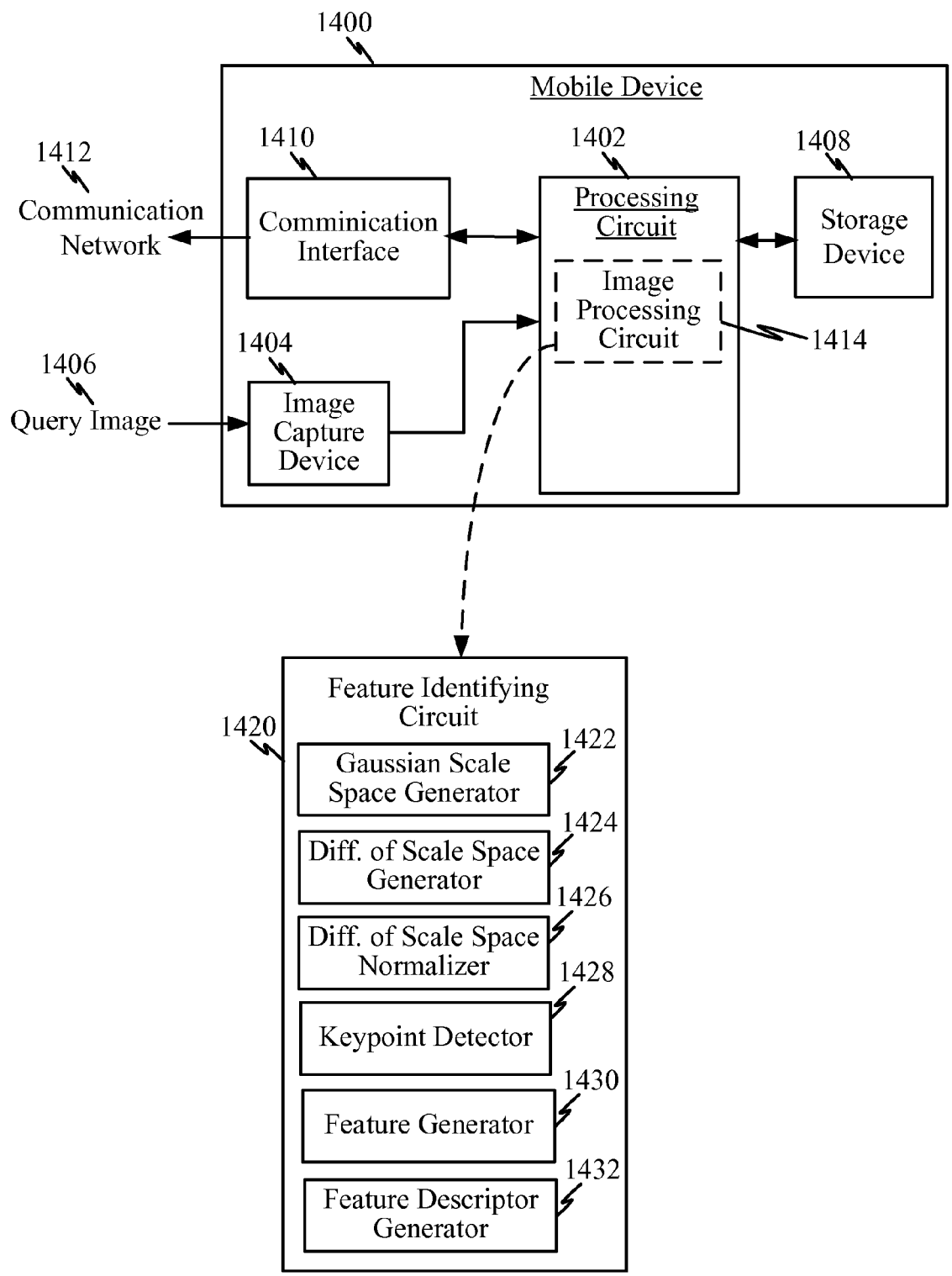
FIG. 14 is a block diagram illustrating an exemplary mobile device adapted to perform image processing for purposes of image or object recognition.

FIG. 14 is a block diagram illustrating an exemplary mobile device adapted to perform image processing for purposes of image or object recognition. The mobile device 1400 may include a processing circuit 1402 coupled to an image capture device 1404, a communication interface 1410 and a storage device 1408. The image capture device 1404 (e.g., digital camera) may be adapted to capture a query image 1406 of interest and provides it to the processing circuit 1402. The processing circuit 1402 may be include an image processing circuit 1414 adapted to process the captured image to generate feature descriptors that can be subsequently transmitted or used for image/object recognition. For example, the image processing circuit 1414 may include or implement a feature identifying circuit 1420 that includes a Gaussian scale space generator 1422, a difference of scale space generator 1424, a difference of scale space normalizer 1426, a keypoint detector 1428, a feature generator 1430, and/or a feature descriptor generator 1432. The Gaussian scale space generator 1422 may serve to convolve an image with a blurring function (e.g., smoothening kernel) to generate a plurality of different scale spaces as illustrated, for example, in FIGS. 2 and 5. The difference of scale space generator 1424 then generates a difference of scale space from the scale space. The difference of scale space normalizer 1426 then normalizes the difference of scale space by, for example, dividing each difference of scale space level by a corresponding smoothened image, where such smoothened image is wider than either the smoothened images used to generate the difference of scale space being divided (illustrated in FIG. 6). The keypoint generator 1428 then identifies or detects keypoints in the normalized difference of scale space (illustrated in FIG. 9). This may be done, for example, by finding local extrema (i.e., maxima or minima) among pixels of the normalized difference of scale space. The feature generator 1430 may then generate features by, for example, characterizing local pixels around the identified keypoint (illustrated in FIG. 3). The feature descriptor generator 1432 then generates a descriptor for each feature to provide a plurality of image descriptors that can serve to identify the query image (illustrated in FIG. 4).

The processing circuit 1402 may then store the one or more feature descriptors in the storage device 1408 and/or may also transmit the feature descriptors over the communication interface 1410 (e.g., a wireless communication interface, transceiver, or circuit) through a communication network 1412 to an image matching server that uses the feature descriptors to identify an image or object therein. That is, the image matching server may compare the feature descriptors to its own database of feature descriptors to determine if any image in its database has the same feature(s).

In one example, the image processing circuit 1414 may implement one or more methods described herein. According to an exemplary implementation, a mobile device may compress feature descriptors for transmission. Because bandwidth tends to be a limiting factor in wireless transmissions, compression of the feature descriptors, by applying the one or more techniques described herein, may reduce the amount of data transmitted over wireless channels and backhaul links in a mobile network.

Exemplary Method for Feature Detection in Normalized Scale Space

Figure 15:
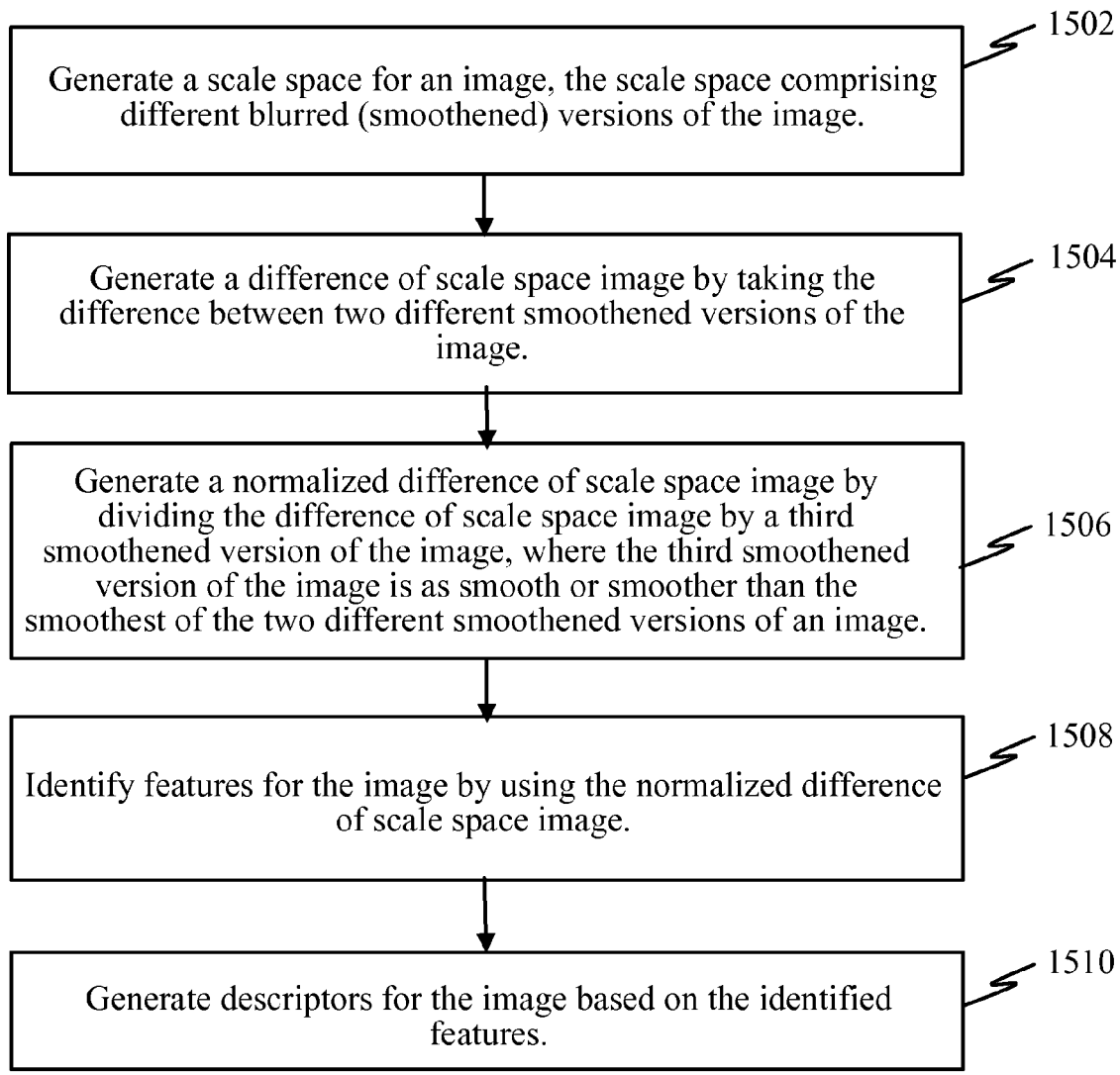
FIG. 15 illustrates a method for feature detection using a normalized difference of scale space.

FIG. 15 illustrates a method for feature detection using a normalized difference of scale space. A (Gaussian) scale space may be generated for an image, where the scale space may comprise different blurred (smoothened) versions of the image 1502. A difference of scale space image may be generated by taking the difference between two different smoothened versions of the image 1504 (from the scale space). This process may be repeated for a plurality of other (e.g., adjacent) smoothened versions of the image to obtain a plurality of difference of scale space images. The plurality of difference of scale space images forming a difference of scale space.

A normalized difference of scale space image (level) may then be generated by dividing the difference of scale space image by an third smoothened version of the image, where the third smoothened version of the image is as smooth or smoother than the smoothest of the two different smoothened versions of an image 1506. For instance, the third smoothened version of the image may have an equal or wider scale (e.g., smoothening kernel) than the greater of the scales (e.g., smoothening kernel) for the two different smoothened versions of the image. This process may be repeated for a plurality of difference scale space images to obtain a plurality of normalized difference of scale space images. The plurality of normalized difference of scale space images forming a normalized difference of scale space.

One or more features for the image may be detected or identified by using the normalized difference of scale space image 1508. Similarly, additional features may be detected across the normalized difference of scale space. Descriptors may then be generated for the image based on the identified features 1510.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in the Figures may be rearranged and/or combined into a single component, step, or function or embodied in several components, steps, or functions. Additional elements, components, steps, and/or functions may also be added. The apparatus, devices, and/or components illustrated in Figures may be configured or adapted to perform one or more of the methods, features, or steps described in other Figures. The algorithms described herein may be efficiently implemented in software and/or embedded hardware for example.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in an image feature detection device, comprising:
generating a difference of scale space image by taking the difference between two different smoothened versions of an image;
generating a normalized difference of scale space image by dividing the difference of scale space image by a third smoothened version of the image, where the third smoothened version of the image is as smooth or smoother than the smoothest of the two different smoothened versions of the image;
modifying both the difference of scale space image and the normalized difference of scale space image by an illumination scaling function; and
using the normalized difference of scale space image to detect one or more features for the image.

2. The method of claim 1, further comprising:
convolving the image with a plurality of smoothening kernels of different scaling widths to obtain a plurality of smoothened versions of the image, the plurality of smoothened versions defining a scale space pyramid.

3. The method of claim 2, wherein the two different smoothened versions of the image are adjacent levels in the smoothened scale space pyramid.

4. The method of claim 2, further comprising:
generating a difference of scale space by taking the difference between pairs of different smoothened versions of the image, the difference of scale space image forming part of the difference of scale space.

5. The method of claim 4, wherein the pairs of different smoothened versions of the image are adjacent levels in the smoothened scale space pyramid.

6. The method of claim 2, wherein the third smoothened version of the image has an equal or wider scale than the greater of the scales for the two different smoothened versions of the image.

7. The method of claim 1, further comprising:
identifying the one or more features for the image using the normalized difference of scale space by detecting local extrema within the normalized difference of scale space image.

8. The method of claim 7, wherein each feature includes a keypoint and information about its surrounding points.

9. The method of claim 1, further comprising:
generating descriptors for the image based on the identified one or more features.

10. An image feature detection device, comprising:
a difference of scale space generator adapted to generate a difference of scale space image by taking the difference between two different smoothened versions of an image;
a difference of scale space generator normalizer adapted to generate a normalized difference of scale space image by dividing the difference of scale space image by a third smoothened version of the image, where the third smoothened version of the image is as smooth or smoother than the smoothest of the two different smoothened versions of the image; and
a feature detector adapted to use the normalized difference of scale space image to detect one or more features for the image;
wherein both the difference of scale space image and the normalized difference of scale space image are modified by an illumination scaling function.

11. The image feature detection device of claim 10, further comprising:
a scale space generator adapted to convolve the image with a plurality of smoothening kernels of different scaling widths to obtain a plurality of smoothened versions of the image, the plurality of smoothened versions defining a scale space pyramid.

12. The image feature detection device of claim 11, wherein the two different smoothened versions of the image are adjacent levels in the smoothened scale space pyramid.

13. The image feature detection device of claim 11, wherein the difference of scale space generator is adapted to generate a difference of scale space by taking the difference between pairs of different smoothened versions of the image, the difference of scale space image forming part of the difference of scale space.

14. The image feature detection device of claim 13, wherein the pairs of different smoothened versions of the image are adjacent levels in the smoothened scale space pyramid.

15. The image feature detection device of claim 11, wherein the third smoothened version of the image has an equal or wider scale than the greater of the scales for the two different smoothened versions of the image.

16. The image feature detection device of claim 10, wherein the feature detector is adapted to identify features for the image using the normalized difference of scale space by detecting local extrema within the normalized difference of scale space image.

17. The image feature detection device of claim 10, further comprising:
a feature descriptor generator adapted to generate descriptors for the image based on the identified one or more features.

18. A image feature detection device, comprising:
means for generating a difference of scale space image by taking the difference between two different smoothened versions of an image;
means for generating a normalized difference of scale space image by dividing the difference of scale space image by a third smoothened version of the image, where the third smoothened version of the image is as smooth or smoother than the smoothest of the two different smoothened versions of the image;
means for using the normalized difference of scale space image to detect one or more features for the image; and
means for modifying both the difference of scale space image and the normalized difference of scale space image by an illumination scaling function.

19. The image feature detection device of claim 18, further comprising:
means for convolving the image with a plurality of smoothening kernels of different scaling widths to obtain a plurality of smoothened versions of the image, the plurality of smoothened versions defining a scale space pyramid.

20. The image feature detection device of claim 19, further comprising:
means for generating a difference of scale space by taking the difference between pairs of different smoothened versions of the image, the difference of scale space image forming part of the difference of scale space.

21. The image feature detection device of claim 20, wherein the pairs of different smoothened versions of the image are adjacent levels in a smoothened scale space pyramid.

22. The image feature detection device of claim 18, further comprising:
means for identifying the one or more features for the image using the normalized difference of scale space by detecting local extrema within the normalized difference of scale space image.

23. The image feature detection device of claim 18, further comprising:
means for generating descriptors for the image based on the identified one or more features.

24. A non-transitory processor-readable medium having one or more instructions operational on an image feature detection device, which when executed by a processor causes the processor to:
generate a difference of scale space image by taking the difference between two different smoothened versions of an image;
generate a normalized difference of scale space image by dividing the difference of scale space image by a third smoothened version of the image, where the third smoothened version of the image is as smooth or smoother than the smoothest of the two different smoothened versions of the image; and
use the normalized difference of scale space image to detect one or more features for the image;
wherein both the difference of scale space image and the normalized difference of scale space image are modified by an illumination scaling function.

25. The non-transitory processor-readable medium of claim 24, having one or more instructions which when executed by a processor causes the processor to further:
convolve the image with a plurality of smoothening kernels of different scaling widths to obtain a plurality of smoothened versions of the image, the plurality of smoothened versions defining a scale space pyramid.

26. The non-transitory processor-readable medium of claim 25, having one or more instructions which when executed by a processor causes the processor to further:
generate a difference of scale space by taking the difference between pairs of different smoothened versions of the image, the difference of scale space image forming part of the difference of scale space.

27. The non-transitory processor-readable medium of claim 24, having one or more instructions which when executed by a processor causes the processor to further:
identify the one or more features for the image using the normalized difference of scale space by detecting local extrema within the normalized difference of scale space image.

28. The non-transitory processor-readable medium of claim 24, having one or more instructions which when executed by a processor causes the processor to further:
generate descriptors for the image based on the identified one or more features.

29. The method of claim 1, further comprising neutralizing the effect of illumination by a normalization process that factors out the illumination scaling function.

30. The method of claim 1, wherein modifying both the difference of scale space image and the normalized difference of scale space image by an illumination scaling function comprises multiplying both the numerator and the denominator of a normalizing function by the illumination scaling function.

31. The method of claim 30, wherein multiplying both the numerator and the denominator of a normalizing function by the illumination scaling function completely or substantially cancels the effect of the illumination scaling function.

32. The method of claim 1, wherein the illumination scaling function is spatially varying.

33. The method of claim 1, wherein the illumination scaling function is spatially constant.

* * * * *